(12) United States Patent
Muraishi

(10) Patent No.: US 12,431,578 B2
(45) Date of Patent: Sep. 30, 2025

(54) BATTERY PACK AND METHOD FOR PRODUCING THE BATTERY PACK

(71) Applicant: PRIMEARTH EV ENERGY CO., LTD., Kosai (JP)

(72) Inventor: Kousuke Muraishi, Hamamatsu (JP)

(73) Assignee: TOYOTA BATTERY CO., LTD., Kosai (JP)

( * ) Notice: Subject to any disclaimer, the term of this patent is extended or adjusted under 35 U.S.C. 154(b) by 632 days.

(21) Appl. No.: 17/874,532

(22) Filed: Jul. 27, 2022

(65) Prior Publication Data
US 2023/0035839 A1    Feb. 2, 2023

(30) Foreign Application Priority Data

Jul. 30, 2021 (JP) .................................. 2021-125478
Jun. 29, 2022 (JP) .................................. 2022-104561

(51) Int. Cl.
*H01M 50/264*    (2021.01)
*H01M 50/209*    (2021.01)
*H01M 50/291*    (2021.01)

(52) U.S. Cl.
CPC ....... *H01M 50/264* (2021.01); *H01M 50/209* (2021.01); *H01M 50/291* (2021.01)

(58) Field of Classification Search
None
See application file for complete search history.

(56) References Cited

U.S. PATENT DOCUMENTS

2022/0140430 A1*  5/2022  Tate ................... H01M 50/209
                                                 429/163

FOREIGN PATENT DOCUMENTS

| CN | 206443430 U | 8/2017 |
|---|---|---|
| CN | 208531114 U | 2/2019 |
| JP | 2012-243534 A | 12/2012 |
| JP | 2017-188207 A | 10/2017 |
| JP | 2020-095895 A | 6/2020 |

* cited by examiner

*Primary Examiner* — Wyatt P McConnell
(74) *Attorney, Agent, or Firm* — Oliff PLC

(57) ABSTRACT

A battery pack includes a battery stack including a plurality of battery cells and a case member in which the battery stack is housed. The case member includes an end wall part located on one end of the battery stack in a stacking direction and continuously integrated with a floor part, and a mounting-shape part located on an opposite end from the end wall part and configured to mount a panel-shaped member. The battery stack is retained in the case member while being held by compression between the end wall part and the end panel on the other end. The end panel is pressed against the mounting-shape part in a direction away from the end wall part by compression reaction force of the battery stack, and fixed therein.

7 Claims, 16 Drawing Sheets

BATTERY PACK AND METHOD FOR PRODUCING THE BATTERY PACK

CROSS-REFERENCE TO RELATED APPLICATIONS

This application is based upon and claims the benefit of priority to Japanese Patent Applications No. 2021-125478 filed on Jul. 30, 2021 and 2022-104561 filed on Jun. 29, 2022, the entire contents of which are incorporated herein by reference.

BACKGROUND

Technical Field

The present disclosure relates to a battery pack that includes a battery stack including stacked battery cells and a case member housing the battery stack, and a method for producing the battery pack.

Related Art

One example of a conventional battery pack is disclosed in Japanese unexamined patent application publication No. 2012-243534. In the battery pack of this publication, end plates are placed at both ends in a stacking direction of battery cells stacked to constitute a battery stack, and the end plates are connected to each other by binding bars. Each binding bar is provided with an extendable mechanism that can expand and contract in the stacking direction of the battery cells, so that the extendable mechanism of each binding bar can be fixed at any position. This secures the battery pack under an appropriate pressure even when battery stacks have individual differences in the length in the stacking direction.

SUMMARY

Technical Problems

The above-mentioned conventional art has a problem of high production costs of battery packs. Specifically, this is because, for example, if the binding bar is configured with the extendable function to absorb individual differences in the length of the battery stacks in the stacking direction, this configuration needs parts for enabling the extendable function and parts for locking the extendable function after adjusting the extendable function, increasing the number of parts of a battery pack. Furthermore, as the number of parts increases, adjustment and assembly processes for those parts are also apt to be complicated.

The present disclosure has been made to address the above problems and has a purpose to provide a battery pack with reduced production costs and a method for producing the battery pack.

Means of Solving the Problems

To achieve the above-mentioned purpose, one aspect of the present disclosure provides a battery pack comprising: a battery stack including a plurality of battery cells stacked one on another; a case member in which the battery stack is housed, the case member including: a floor part located under the battery stack; an end wall part located on one end in a stacking direction of the battery cells, the end wall part being continuously integrated with the floor part; and a mounting-shape part located on an end opposite from the end wall part, the mounting-shape part being configured to mount a panel-shaped member; and an end panel, which is the panel-shaped member, mounted in the mounting-shape part, the battery stack being retained in the case member while being held by compression between the end wall part and the end panel, and the end panel being pressed against the mounting-shape part in a direction away from the end wall part by compression reaction force of the battery stack, so that the end panel is fixed in the mounting-shape part.

In the battery pack configured as above, the battery stack and the end panel are fixed by the compression reaction force of the battery stack that is held by compression, i.e., sandwiched under pressure. Specifically, for example, the battery pack in the present aspect does not need any means for fastening or bonding to fix the end panel, and thus this battery pack can be produced at low costs.

Another aspect of the present disclosure provides a method for producing a battery pack, the battery pack comprising a battery stack including a plurality of battery cells and a case member in which the battery stack is housed, the case member including: a floor part located under the battery stack; an end wall part located on one end in a stacking direction of the battery cells, the end wall part being continuously integrated with the floor part; and a mounting-shape part located on an end opposite from the end wall part, the mounting-shape part being configured to mount a panel-shaped member, wherein the method comprises: inserting the battery stack into the case member while compressing the battery stack in the stacking direction, and pressing one end of the battery stack in the stacking direction against the end wall part; mounting an end panel, which is the panel-shaped member, in the mounting-shape part; and releasing the battery stack from the compressing to allow an opposite end of the battery stack in the stacking direction to press against the end panel so that: the battery stack is housed in the case member while being held by compression between the end wall part and the end panel, and the end panel is pressed against the mounting-shape part in a direction away from the end wall part by compression reaction force of the battery stack, so that the end panel is fixed in the mounting-shape part.

According to the method for producing a battery pack in the foregoing aspect, the battery stack and the end panel can be fixed by the compression reaction force of the battery stack held by compression. Specifically, for example, the above method does not need fastening or welding to fix the end panel, and thus this method can produce the battery pack at low costs.

The present disclosure can achieve a battery pack with reduced production costs and a method for producing the battery pack.

DETAILED DESCRIPTION OF THE EXEMPLARY EMBODIMENTS

A detailed description of embodiments of the present disclosure will now be given referring to the accompanying drawings. A first embodiment will be described first as below and other embodiments will be described with a focus on differences from the preceding embodiment(s).

First Embodiment

Figure 1:
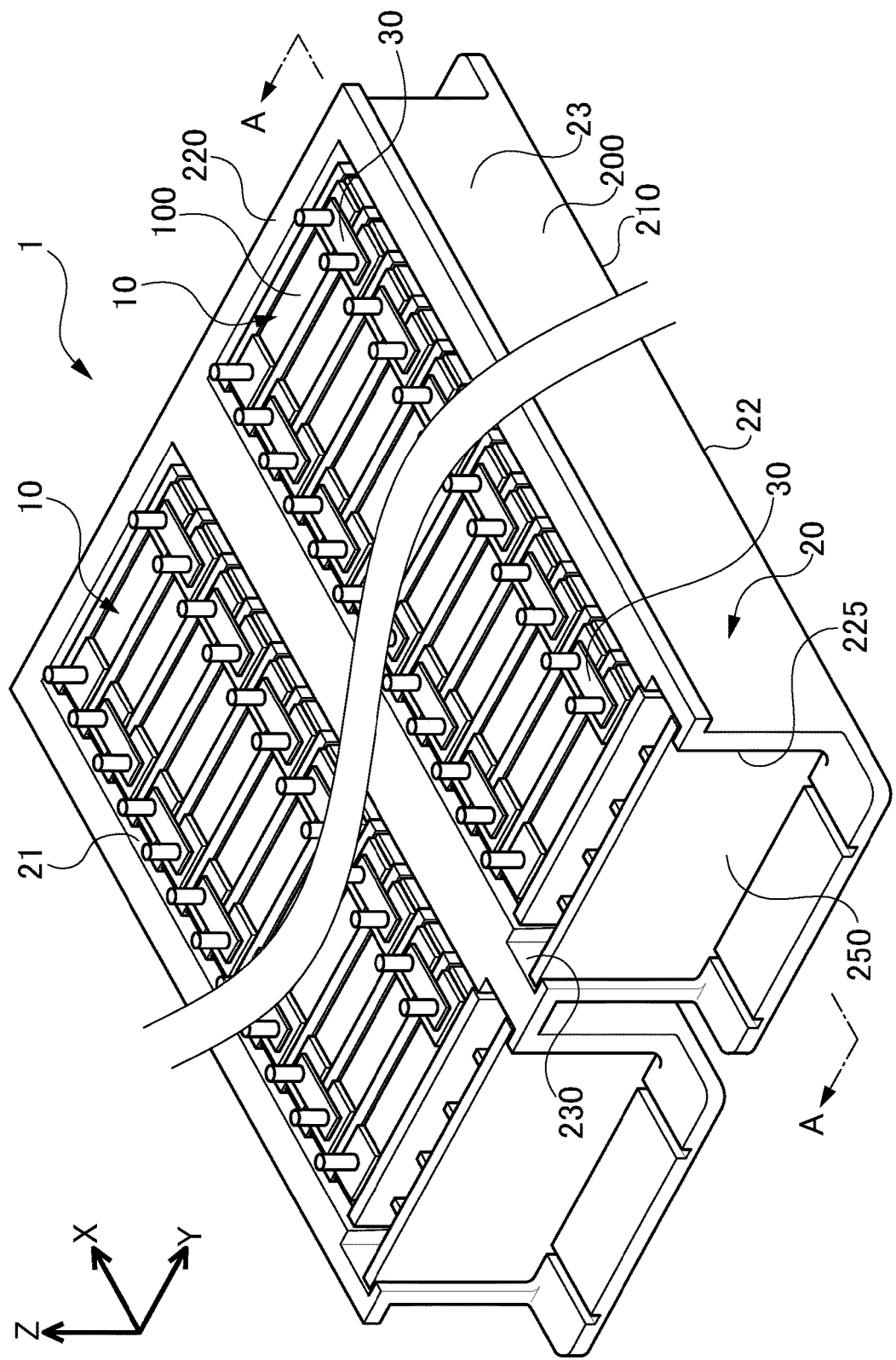
FIG. 1 is an external perspective view of a battery pack in a first embodiment.

In the first embodiment, the present disclosure is embodied in a battery pack 1, the entire configuration of which is shown in FIG. 1. The battery pack 1 in FIG. 1 includes battery stacks 10 and a battery case 20 in which the battery stacks 10 are housed.

Each battery stack 10 is configured including a plurality of rectangular battery cells 100. The battery cells 100 in each battery stack 10 are stacked one on another in a direction X in FIG. 1, which is also referred to as a stacking direction. The battery cells 100 in FIG. 1 are illustrated with the width and the height respectively matched with a direction Y and a direction Z. The battery pack 1 in the present embodiment includes two battery stacks 10 arranged side by side in the direction Y. The direction X and the direction Y are horizontal directions, and the direction Z is a vertical direction.

A battery case 20 includes a bottom part 22 located under the battery stacks 10 and side walls 23 extending upward from the bottom part 22, and has a box-shaped configuration having an open upper side. The battery case 20 is provided with two housing spaces 21, which are surrounded and formed by the bottom part 22 and the side walls 23. The two battery stacks 10 are housed one by one in those housing spaces 21.

The battery case 20 is constituted of a case member 200 and an end panel 250 assembled to the case member 200. The case member 200 includes a floor part 210 forming the bottom part 22. The case member 200 further includes an end wall part 220 forming one of the side walls 23, located on one end in the stacking direction of the battery cells 100 of each battery stack 10. The floor part 210 and the end wall part 220 constitute a part of the case member 200, and are continuously integrated with each other.

The case member 200 is provided with an opening 225 at the end opposite from the end wall part 220 in the stacking direction of the battery cells 100 of each battery stack 10. The case member 200 is provided, in the edge of the opening 225, with a mounting part 230. In this mounting part 230 provided at the opening 225 of the case member 200, the end panel 250 is mounted. The details of the mounting part 230 will be described later. The end panel 250 mounted in the mounting part 230 closes the opening 225 of the case member 200. Depending on the actual situation where the battery pack 1 is used, a cover member or the like may be attached to cover the upper side of the battery pack 1.

Figure 2:
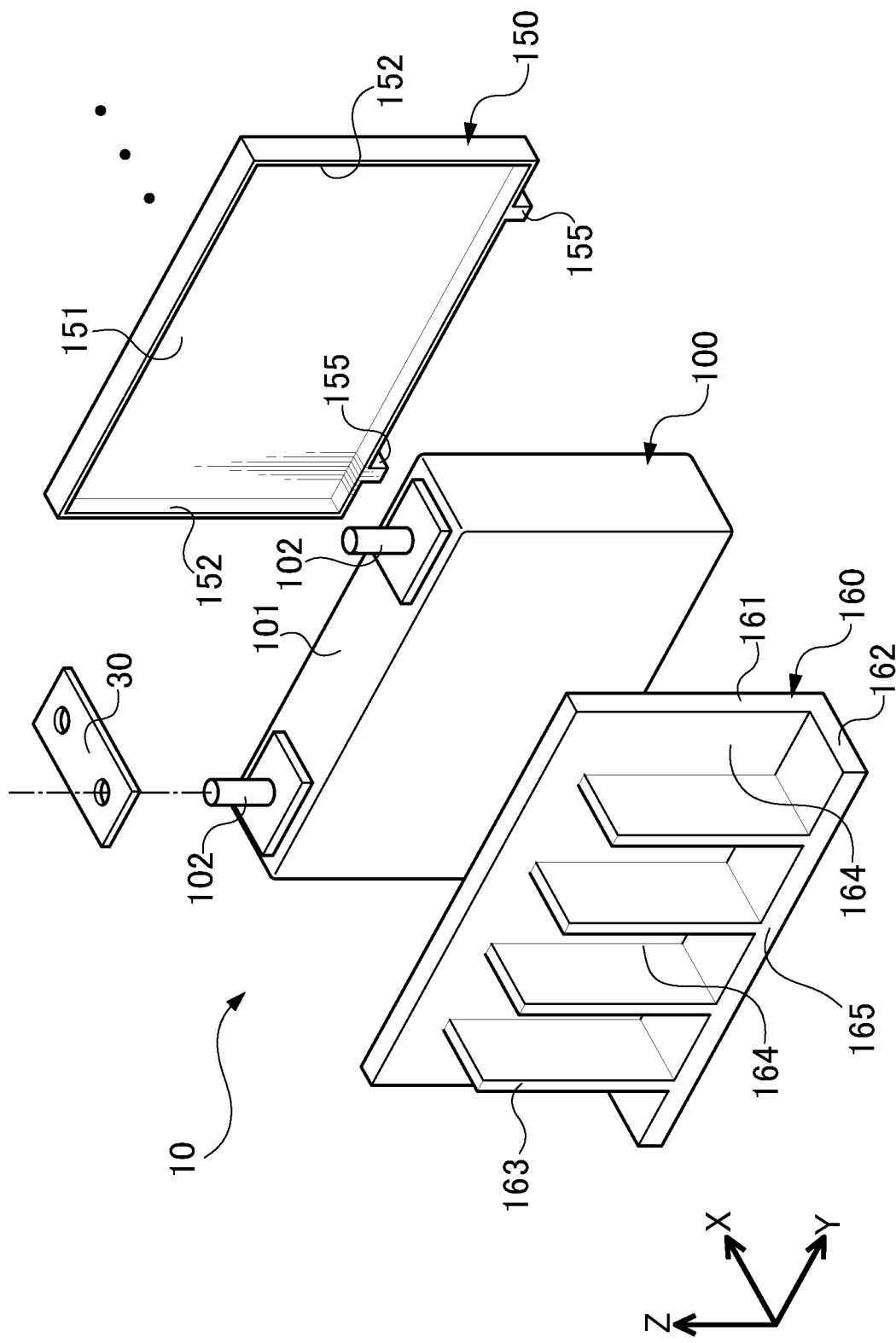
FIG. 2 is an exploded perspective view of a battery stack constituting the battery pack in the first embodiment.

FIG. 2 is an exploded view of the battery stack 10. The battery stack 10 includes the battery cells 100, spacers 150, and an end plate 160. Each of the battery cells 100 in the present embodiment includes an outer casing made of electrically-conductive metal. Each battery cell 100 is provided, on its upper surface, with two pole terminals 102. One of the pole terminals 102 is a positive electrode, and the other is a negative electrode.

The spacers 150 are made of an insulating material; for example, made of insulating resin. As this material of the spacers 150, a material with high thermal conductivity is preferable to improve the heat dissipation of each battery cell 100. Each spacer 150 is provided with a recessed portion 151 on the side facing the battery cell 100. Each spacer 150 includes inner wall surfaces 152 defining the recessed portion 151, the inner wall surfaces 152 being located at both ends in the width direction of the battery cells 100. When the battery cell 100 is fitted in the recessed portion 151 of the spacer 150, the battery cell 100 and the spacer 150 are assembled to each other.

The battery cell 100 assembled to the spacer 150 contacts the inner wall surfaces 152 of the spacer 150, so that the battery cell 100 and the spacer 150 are positioned to each other in the width direction, in each battery stack 10, a plurality of assemblies each including one battery cell 100 and one spacer 150 are arranged in the X direction. Thus, the battery cells 100 in each battery stack 10 are insulated from each other. Each spacer 150 is provided, at its lower end, with two aligning protrusions 155. These two aligning protrusions 155 are spaced from each other in the width direction. FIG. 2 shows the battery cell 100 and the spacer 150, which are located closest to the end panel 250, in the battery pack 1.

The end plate 160 is located closer to the end panel 250, compared to the closest one of the battery cells 100 to the end panel 250 in the battery stack 10, as shown in FIG. 2. The end plate 160 also may be made of the same material as the spacers 150. The end plate 160 is an L-shaped member including a facing part 161 and a bottom part 162. The facing part 161 extends upward from the bottom part 162 along the outer surface of the battery cell 100 opposed to the end plate 160. The end plate 160 further includes a plurality of ribs 163 connected to the facing part 161 and the bottom part 162. A space 164 is formed between the adjacent ribs 163 and also formed outside each rib 163 located at each end in the width direction.

FIG. 2 shows a busbar 30 for electrically connecting the pole terminals 102 of the adjacent battery cells 100. In the battery pack 1, busbars 30 are connected to every battery cell 100 as shown in FIG. 1. In the battery pack 1, therefore, it is desirable that the pole terminals 102 of the adjacent battery cells 100 are aligned in the direction X, i.e., the stacking direction of the battery cells 100. Specifically, the position of each pole terminal 102 in the width direction is preferably constant in all of the battery cells 100 in the battery pack 1. This is because proper alignment of the pole terminals 102 in the stacking direction enables easy and appropriate connection of the pole terminals 102 with the bus bars 30.

Figure 3:
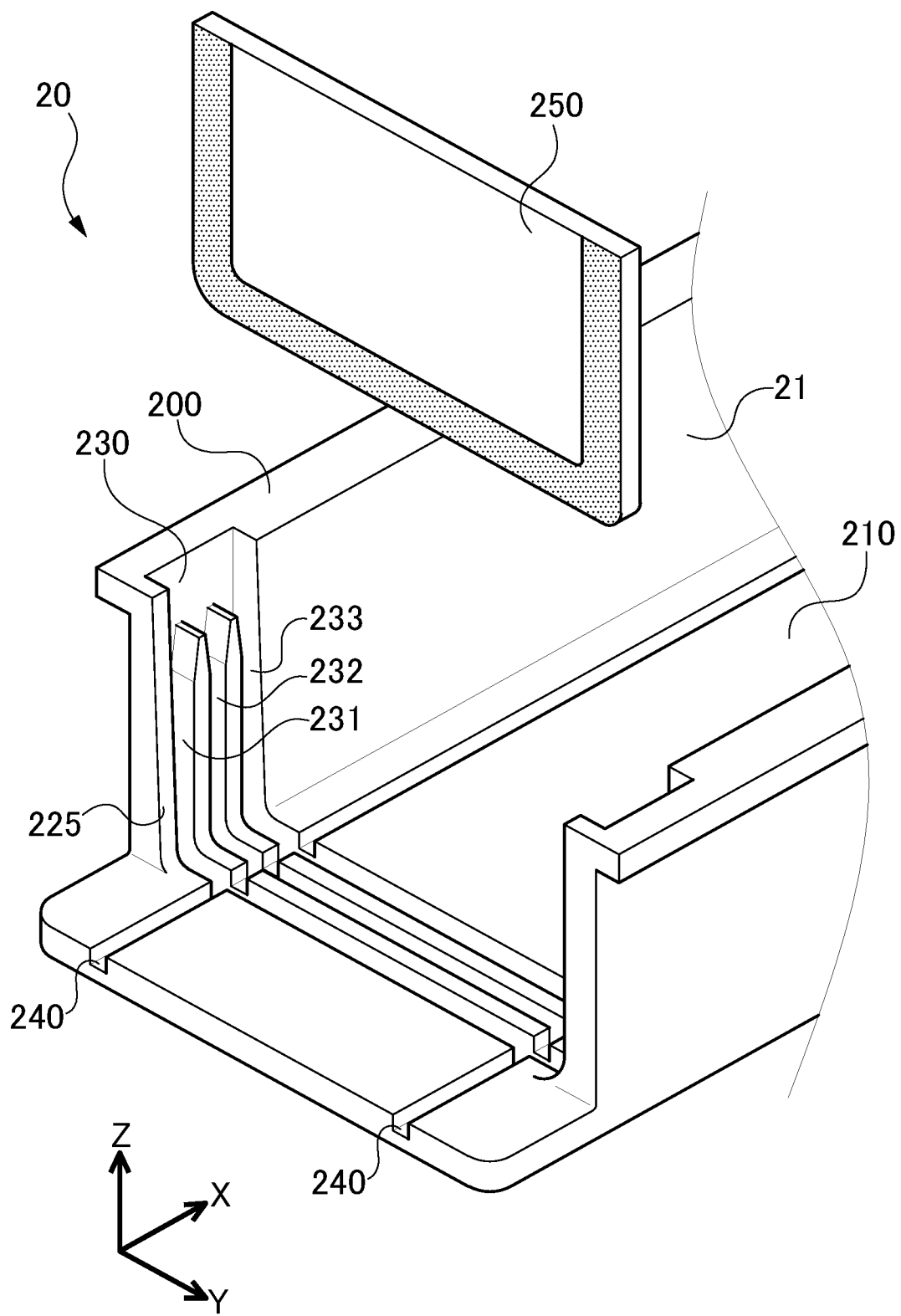
FIG. 3 is an exploded perspective view of a battery case constituting the battery pack in the first embodiment.

FIG. 3 is an exploded perspective view of the battery case 20, showing a mounting part 230 of the case member 200 together with the end panel 250 in an enlarged view. The mounting part 230 of the case member 200 is formed with three grooves along the edge of the opening 225. These three grooves are arranged at intervals in the stacking direction of the battery cells 100. These grooves are referred to as a first mounting-shape part 231, a second mounting-shape part 232, and a third mounting-shape part 233 in order closer to the opening 225. These mounting-shape parts 231 to 233 each have a width enough to allow insertion of the end panel 250.

The end panel 250 is a flat panel-shaped member. The end panel 250 is inserted from above into one of the first, second, and third mounting-shape parts 231, 232, and 233, and is mounted in the mounting part 230. In FIG. 3, a part of the end panel 250 is hatched with dots, which is to be pressed against the mounting part 230. For example, if it is desired to prevent water from entering in the battery pack 1, an elastic sealing member can be provided on the hatched portion of the end panel 250. This configuration can enhance the water resistance of the battery pack 1.

On the upper surface of the floor part 210 of the case member 200, there are formed two aligning grooves 240 extending in the stacking direction of the battery cells 100 of each battery stack 10. Specifically, the aligning grooves 240 each extend from the end of the floor part 210 near the opening 225 to the end wall part 220. The aligning grooves 240 each have a width corresponding to each aligning protrusion 155 of the spacers 150 and are spaced at an interval corresponding to the interval between the aligning protrusions 155 of each spacer 150 in the direction Y.

Figure 4:
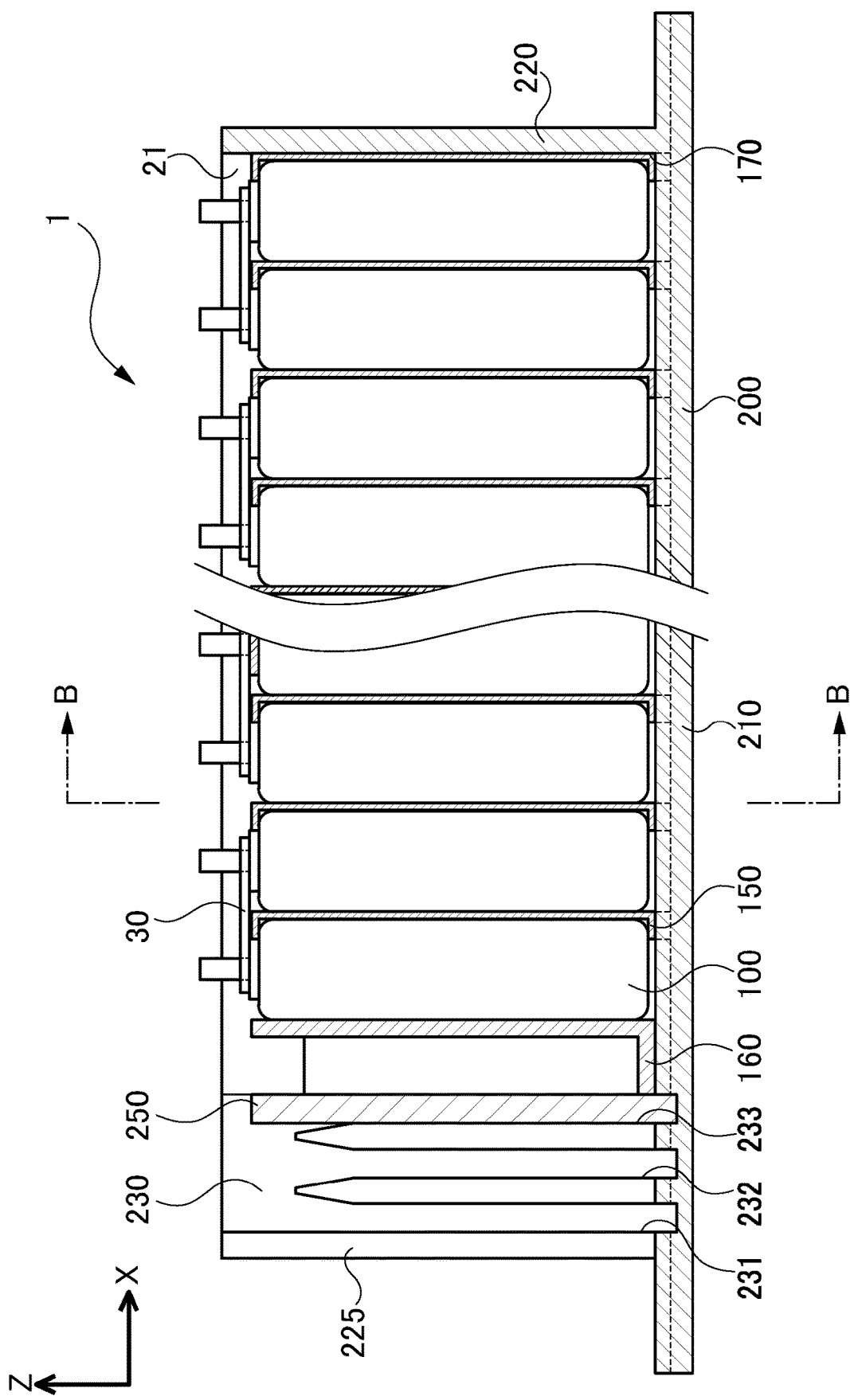
FIG. 4 is a cross-sectional view (A-A in FIG. 1) in a stacking direction of battery cells of the battery pack in the first embodiment.

FIG. 4 is a cross-sectional view of the battery pack 1 in the stacking direction of the battery cells 100, taken along A-A in FIG. 1. As shown in FIG. 4, the end plate 160 is placed on one end of the battery stack 10 close to the end panel 250 in the stacking direction. Further, an end plate 170 is placed on the opposite end of the battery stack 10 close to the end wall part 220 in the stacking direction. The end plate 170 in the present embodiment is positioned with the adjacent battery cell 100 and includes protrusions identical to the aligning protrusions 155 of each spacer 150.

In the battery pack 1 shown in FIG. 4, the end panel 250 is mounted in the third mounting-shape part 233 of the mounting part 230. In this state, the battery stack 10 in the battery pack 1 is compressed in the stacking direction. In other words, the length of the battery stack 10 in the stacking direction after being assembled in the battery pack 1 is shorter than that the battery stack 10 in a non-compressed state before being assembled in the battery pack 1. The battery stack 10 held by compression, i.e., sandwiched under pressure, as above generates a compression reaction force, causing the end plates 160 and 170 located at either end of the battery stack 10 to respectively press against the end panel 250 and the end wall part 220 in a direction to move the end panel 250 and the end wall part 220 away from each other.

The end panel 250 mounted in the third mounting-shape part 233 is pressed against this mounting-shape part 233 in a direction away from the end wall part 220. Specifically, the end panel 250 is pressed against an inner wall of the third mounting-shape part 233 having a groove shape, located on the opposite side from the end wall part 220, that is, a left inner wall surface 233b in FIG. 4. This pressing on the end panel 250 by the compression reaction force of the battery stack 10 generates a strong frictional force between the end panel 250 and the third mounting-shape part 233. This frictional force restrains the end panel 250 from moving in a direction of coming off the third mounting-shape part 233, i.e., in an upward direction. Therefore, the end panel 250 is fixed to the third mounting-shape part 233. In this embodiment, the case member 200 and the end panel 250 are subjected to the compression reaction force of the battery stack 10. Accordingly, the case member 200 and the end panel 250 may be made of any material that can appropriately compress the battery stack 10 and also withstand the compression reaction force thereof.

The battery pack 1 configured as above in the present embodiment needs no special fastening or bonding to fix the end panel 250. This configuration can reduce the production cost of the battery pack 1. Further, as described above, a sealing member may be provided on the part of the end panel 250 which contacts the third mounting-shape part 233, so that the compression reaction force of the battery stack 10 enhances the water sealing property of that part. In other words, the waterproof property of the battery pack 1 can be improved even without e.g., bonding the end panel 250 to the case member 200.

Figure 5:
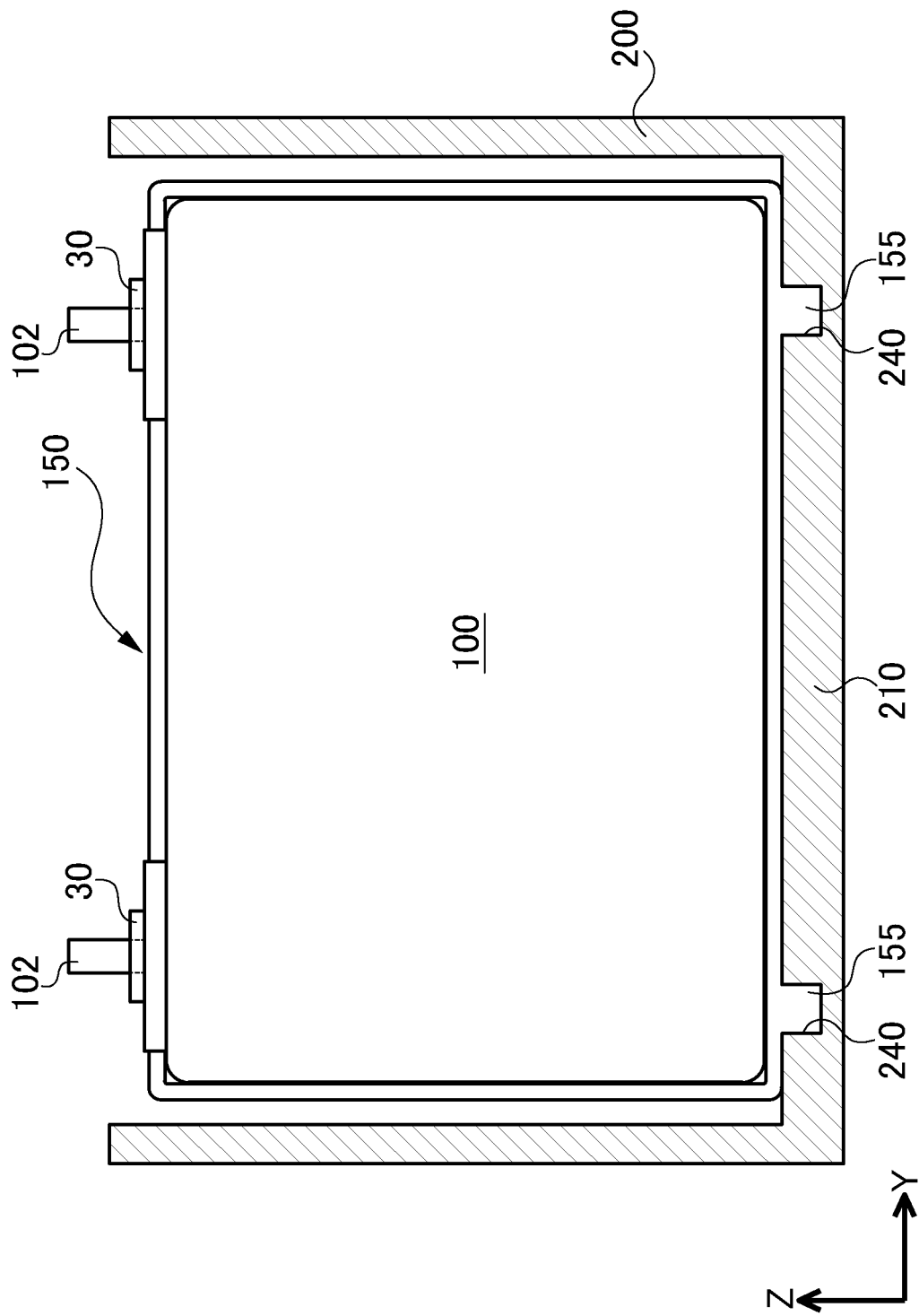
FIG. 5 is a cross-sectional view (B-B in FIG. 4) in a width direction of the battery pack in the first embodiment.

FIG. 5 is a cross-sectional view of the battery pack 1 in the width direction of the battery cells 100, taken along B-B in FIG. 4. As shown in FIG. 5, the two aligning protrusions 155 provided at the lower end of each spacer 150 are individually engaged in the two aligning grooves 240 provided in the upper surface of the floor part 210 of the case member 200. Therefore, the positions of the spacers 150 of the battery stack 10 in the width direction, namely, in the direction Y in FIG. 5, are coincident with each other, relative to the case member 200. Further, the positions of the battery cells 100 attached to the spacers 150 in the width direction are also constant relative to the case member 200. Thus, in each battery stack 10 of the battery pack 1, the pole terminals 102 of the adjacent battery cells 100 are aligned in the stacking direction. The aligning grooves 240 provided in the floor part 210 therefore function as an aligning-shape part for aligning the battery cells 100 of the battery stack 10 in the stacking direction. Moreover, each of the spacers 150 including the aligning protrusions 155 functions as an engagement member that can engage with the aligning grooves 240. The spacers 150 are one example of the engagement member of the present disclosure.

Next, a method for producing the battery pack 1 in the present embodiment will be described below. In the present embodiment, for producing the battery pack 1, the battery stacks 10 are first inserted in the case member 200, and then the end panels 250 are assembled in the case member 200. Since the battery stacks 10 are identical in configuration, the following explanation will be given to only one of the battery stacks 10 for convenience.

Figure 6:
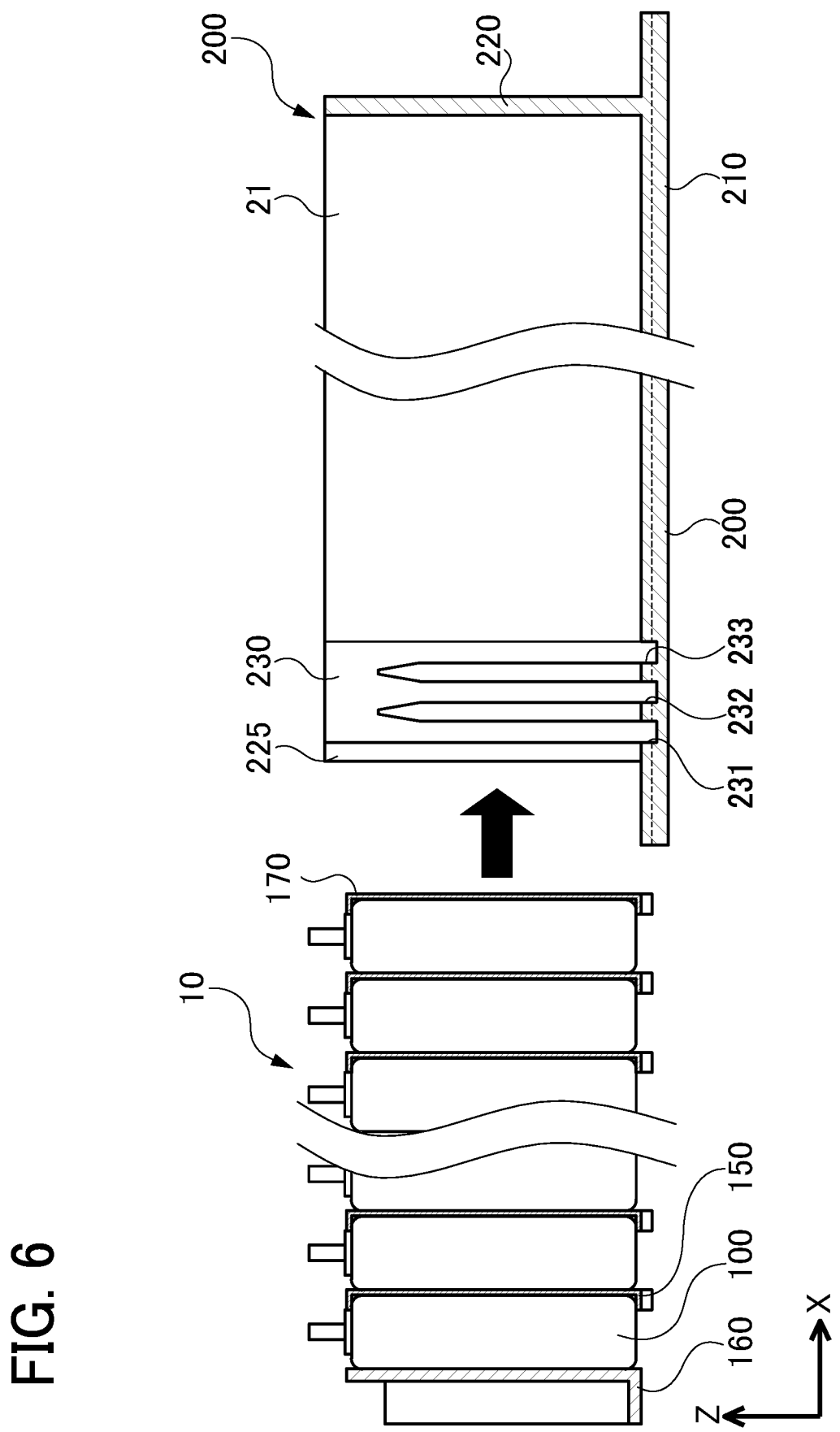
FIG. 6 is an explanatory view showing a process of inserting the battery stack into a case member in the first embodiment.

FIG. 6 is a schematic diagram showing a process of inserting the battery stack 10 into the case member 200. This battery stack 10 is made by stacking of a plurality of assemblies each including one battery cell 100 and one spacer 150 in advance of insertion into the case member 200. In the present embodiment, the end plate 160 is stacked on the battery stack 10 at the end which will be located close to the end panel 250 in the stacking direction of the battery stack 10, i.e., of the battery cells 100. Then, as shown in FIG. 6, the battery stack 10 is inserted into the case member 200, starting with the end plate 170 opposite the the end plate 160.

For example, insertion of the battery stack 10 into the case member 200 can be performed by moving at least either the battery stack 10 or the case member 200 while holding the battery stack 10 with a chuck device that clamps the battery stack 10 in the width direction or the vertical direction. The case member 200 may be provided with a relief part to avoid interference with the chuck device that holds the battery stack 10, if necessary.

Figure 7:
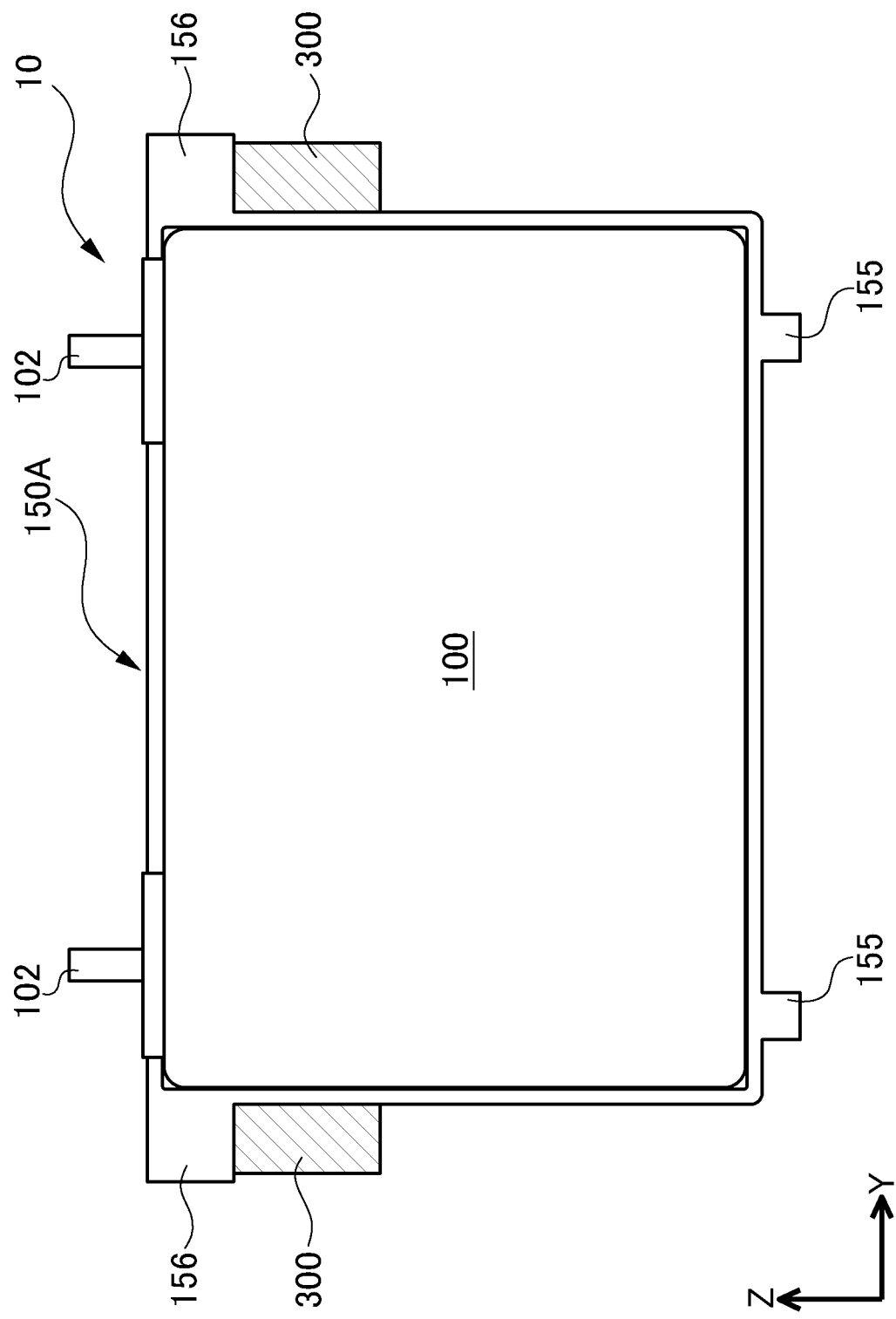
FIG. 7 is an explanatory view showing a concrete example of inserting the battery stack into the case member in the first embodiment.

FIG. 7 shows a concrete example of the spacers 150 adapted for clamping of the battery stack 10 in the width direction to insert battery stack 10 into the case member 200. Specifically, a spacer 150A shown as one example in FIG. 7 is provided with protruding portions 156 overhanging outward from both sides in the width direction. When this spacer 150A is employed, the battery stack 10 can be held by chuck claws 300 as shown in FIG. 7. The chuck claws 300 support the protruding portions 156 from below and clamp the battery stack 10 in the width direction under the protruding portions 156. Thus, the battery cells 100 of the battery stack 10, which are loaded and aligned in the stacking direction in advance in an equipment provided with the chuck claws 300, can be inserted into the case member 200.

To be specific, the battery stack 10 is inserted into the housing space 21 of the case member 200 by passing through the opening 225 of the case member 200 while making the lower surface of the battery stack 10 slide along the floor part 210. This operation of inserting the battery stack 10 into the case member 200 is continued, for example, until the end plate 170 comes into contact with the end wall part 220.

The aligning protrusions 155 of the spacers 150 protrude downward from the bottom of the battery stack 10. Thus, when the battery stack 10 is to be inserted in the case member 200, the aligning protrusions 155 are fitted in the aligning grooves 240. Thereafter, as the battery stack 10 is being moved to a deeper side of the housing space 21 of the case member 200, the aligning protrusions 155 are moved while being guided by the aligning grooves 240.

Figure 8:
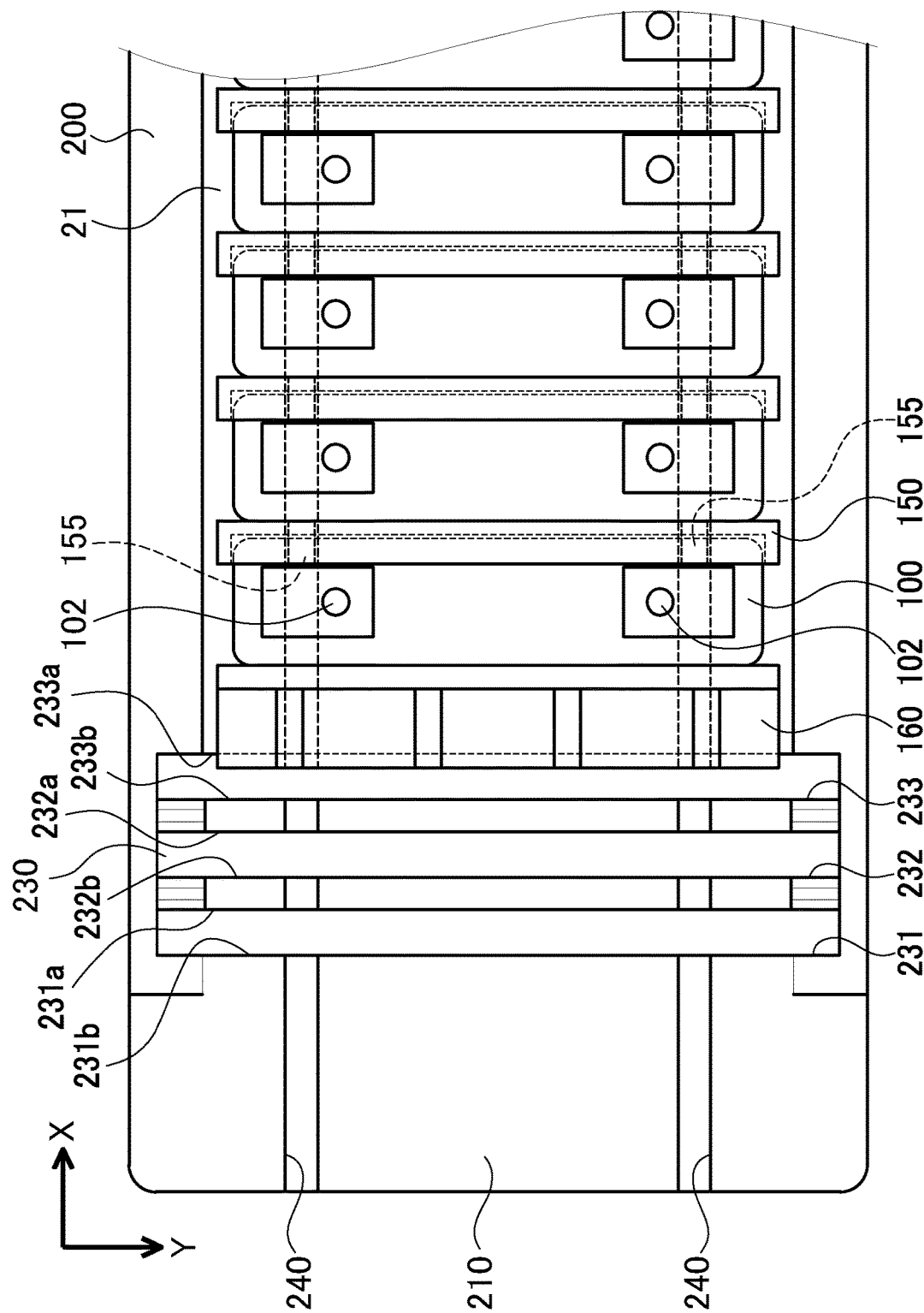
FIG. 8 is an explanatory view showing a battery stack aligned in the case member in the first embodiment.

FIG. 8 is a plan view of the battery stack 10 inserted in the case member 200. Since the battery stack 10 is inserted in the case member 200 with the aligning protrusions 155 guided by the aligning grooves 240, as shown in FIG. 8, the positions of the battery cells 100 in the width direction are constant. That is, the battery cells 100 are aligned in the stacking direction. Thus, the pole terminals 102 of the adjacent battery cells 100 are also aligned in the stacking direction.

As shown in FIG. 8, the battery stack 10 in a non-compressed state, which is merely inserted in the case member 200, overlaps and covers over at least one of the first mounting-shape part 231, the second mounting-shape part 232, and the third mounting-shape part 233. In FIG. 8, concretely, the third mounting-shape part 233 is partly hidden under, i.e., covered by, the battery stack 10.

Figure 9:
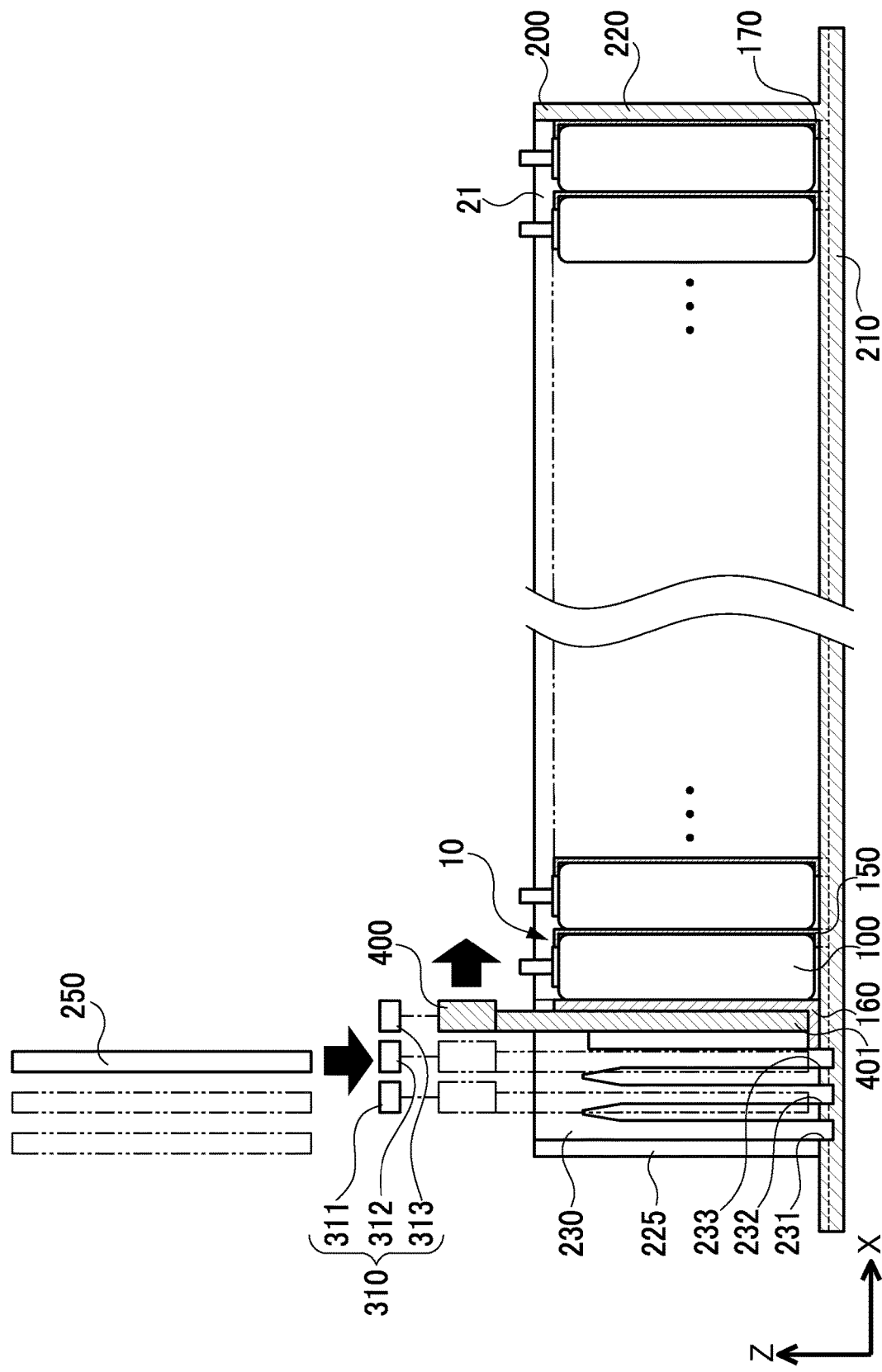
FIG. 9 is an explanatory view showing a process of mounting an end panel while compressing the battery stack in the first embodiment.

FIG. 9 is an explanatory diagram showing a process of assembling the end panel 250. This assembling of the end panel 250 is performed while compressing the battery stack 10 in the stacking direction. In the present embodiment, the battery stack 10 is compressed by a pressing device including a pressing unit 400 for pressing the end plate 160. The pressing unit 400 includes a distal end portion 401 (i.e., a lower end portion in the figure) having a shape that can be inserted in the spaces 164 (e.g., a comb-like shape) without interfering with the ribs 163. This pressing unit 400 is pressed against the end plate 160 as shown in FIG. 9.

Specifically, the battery stack 10 is moved forward by the pressing unit 400 from the side of the the mounting part 230 toward the end wall part 220. Accordingly, the battery stack 10 is compressed in the stacking direction while the end plate 170 on the opposite side of the battery stack 10 from the pushing side is pressed against the end wall part 220. In the present embodiment, the battery stack 10 is compressed by the pressing unit 400 under a predetermined constant pressure. During this compressing process, each battery cell 100 and others of the battery stack 10 are moved toward the end wall part 220. However, the battery cells 100 will not get misalignment because the aligning protrusions 155 of the spacers 150 and the aligning grooves 240 of the case member 200 engage with each other.

Herein, the components of each battery stack 10, such as the battery cells 100 and the spacers 150, have individual differences in length in the stacking direction. When such battery cells 100 and spacers 150 having individual differences are stacked in layers to make up each battery stack 10, the individual differences in total length in the stacking direction are apt to be large between the battery stacks 10.

For the above reason, the position of the pressing unit 400 that compresses the battery stack 10 under a constant pressure may differ depending on the battery stacks 10. In the present embodiment, therefore, the position of the pressing unit 400 that compresses the battery stack 10 in the stacking direction is detected by a detecting unit 310. This detecting unit 310 includes a first detecting part 311, a second detecting part 312, and a third detecting part 313, which are arranged in the order far from the end wall part 220.

The first detecting part 311 detects the pressing unit 400 when an end portion of the end plate 160 of the battery stack 10 under compression, having a contact surface 165 of the end plate 160 which comes into contact with the end panel 250, is located on the end wall part 220 side relative to a right inner wall surface 231a of the first mounting-shape part 231 and also on the opening 225 side relative to the right inner wall surface 232a of the second mounting-shape part 232. The second detecting part 312 detects the pressing unit 400 when the end portion of the end plate 160 of the battery stack 10 under compression is located on the end wall part 220 side relative to the right inner wall surface 232a of the second mounting-shape part 232 and also on the the opening 225 side relative to a right inner wall surface 233a of the third mounting-shape part 233. The third detecting part 313 detects the pressing unit 400 when the end portion of the end plate 160 of the battery stack 10 under compression is located the end wall part 220 side relative to the right inner wall surface 233a of the third mounting-shape part 233.

Then, depending on a detection state of the detecting unit 310, the end panel 250 is inserted from above and assembled into the mounting part 230. Specifically, when the first detecting part 311 is in a detection state, i.e., the first detecting part 311 detects the pressing unit 400, the end panel 250 is assembled into the first mounting-shape part 231. When the second detecting part 312 is in a detection state, the end panel 250 is assembled into the second mounting-shape part 232. When the third detecting part 313 is in a detection state, the end panel 250 is assembled into the third mounting-shape part 233. In other words, the end panel 250 is mounted at the position where a gap between the end plate 160 of the battery stack 10 in a compressed state and the end panel 250 is smallest. In FIG. 9, the third detecting part 313 of the detecting part 310 is in the detection state and thus the end panel 250 is assembled to the third mounting-shape part 233.

Subsequently, the pressing unit 400 is pulled out upwardly, releasing the battery stack 10 from compression by the pressing unit 400. The battery stack 10 released from the compression thus expands from the compressed state in the stacking direction. A difference in the total length of the battery stack 10 in the stacking direction in the present embodiment between in the compressed state and in the non-compressed state is larger than the pitch of the first mounting-shape part 231, the second mounting-shape part 232, and the third mounting-shape part 233. This pitch indicates a distance between the adjacent mounting-shape parts 231, 232, and 233, that is, respective left inner wall surfaces 231b, 232b, and 233b. Furthermore, the battery stack 10 having the shortest total length in the non-compressed state is longer than the distance from the end wall part 220 to the left inner wall surface 233b of the third mounting-shape part 233. Therefore, the battery stack 10 is inserted between the end wall part 220 and the end panel 250, which are spaced by a distance shorter than the overall length of the battery stack 10 in the non-compressed state.

As described above, before the battery stack 10 is compressed in the stacking direction, at least a part of the first mounting-shape part 231, the second mounting-shape part 232, or the third mounting-shape part 233, in which the end panel 250 is to be finally assembled, is hidden, i.e., covered, by the non-compressed battery stack 10. Then, the battery stack 10 is compressed until the part of the first mounting-shape part 231, the second mounting-shape part 232, or the third mounting-shape part 233, corresponding to the final mounting position of the end panel 250, is exposed, i.e., uncovered. Subsequently, the end panel 250 is mounted in the corresponding mounting-shape part 231, 232, or 233, and then the battery stack 10 is released from the compression by removal of the pressing unit 400. Accordingly, the end plate 160 of the battery stack 10 released from the compression comes into contact with the end panel 250. The battery pack 1 is thus produced. The battery stack 10 of the battery pack 1 is then subjected to attachment of the bus bars 30 and other assembly operations.

After releasing the compression, even when the battery stack 10 expands from the compressed state to contact with the end panel 250, the battery stack 10 is still in a somewhat compressed state as compared to the non-compressed state. Accordingly, the battery stack 10 of the battery pack 1 is sandwiched between the end wall part 220 and the end panel 250. The battery stack 10 is thus retained in the housing space 21 of the battery case 20. In this state, the end panel 250 in the battery pack 1 is pressed against the third mounting-shape part 233, concretely, its left inner wall surface 233b in FIG. 8, in a direction away from the end wall part 220 by the compression reaction force of the battery stack 10 somewhat compressed as above. This prevents for example the end panel 250 from coming off the third mounting-shape part 233. Therefore, the battery stack 10 and the end panel 250 are appropriately prevented from dropping out of, i.e., separating from the case member 200. In other words, no special fastening or bonding is required to fix the battery stack 10 and the end panel 250.

In the battery pack 1, the case member 200 is provided with three grooves configured to receive the end panel 250; namely, the first mounting-shape part 231, the second mounting-shape part 232, and the third mounting-shape part 233. The end panel 250 is assembled to an appropriate one of the first, second, and third mounting-shape parts 231, 232, and 233, so that the end panel 250 is adequately subjected to the compression reaction force of the battery stack 10. For assembling of the end panel 250, there is no need for complicated positioning according to individual differences between the battery stacks 10, nor for a complicated mechanism for the positioning. Consequently, the battery pack 1 can be manufactured at low costs even when the battery stacks 10 to constitute the battery pack 1 have large individual differences.

The plurality of battery cells 100 in the battery stack 10 are aligned in the stacking direction since the aligning protrusions 155 of each spacer 150 are fitted in the aligning grooves 240 of the case member 200. Aligning the battery cells 100 is performed at the inserting of the battery stack 10 into the case member 200 before the end panel 250 is assembled to the case member 200. The battery stack 10 with the battery cells 100 remained in alignment is compressed and then the end panel 250 is assembled. Even if the battery stack 10 moves due to compression, the battery cells 100 are prevented from coming out of alignment. Furthermore, even after the end panel 250 is assembled, the battery stack 10 compressed is prevented from moving the aligned battery cells 100. In other words, the plurality of battery cells 100 are properly aligned with a simple structure. For this alignment of the battery cells 100, no special process and the like is required. In addition, since the battery cells 100 are aligned properly, the bus bars 30 can be accurately attached afterwards without causing bonding or fastening failures. Consequently, the battery pack 1 with the battery cells 100 aligned properly can be produced at low costs.

According to the present embodiment described in detail as above, the case member 200 used therein includes the floor part 210, the end wall part 220, and the mounting part 230. The floor part 210 is located under the battery stack 10. The end wall part 220 is located on one end of the battery stack 10 in the stacking direction and is continuously integrated with the floor part 210. The mounting part 230 is located on the opposite end from the end wall part 220 and is formed with the third mounting-shape part 233 in which the panel-shaped end panel 250 is mounted. The battery stack 10 is then compressed in the stacking direction until one end of the battery stack 10 in the stacking direction is pressed against the end wall part 220. Subsequently, the end panel 250 is mounted in the third mounting-shape part 233. The battery stack 10 is then released from compression, so that the other end of the battery stack 10 in the stacking direction comes into contact with the end panel 250. Accordingly, the battery stack 10 is held in the case member 200 by being pressed between the end wall part 220 and the end panel 250. Furthermore, the compression reaction force of the battery stack 10 presses the end panel 250 against the third mounting-shape part 233 in a direction away from the end wall part 220, so that the end panel 250 is fixed in place. The battery pack 1 produced as above includes no components that need to be adjusted in length according to variations in the length of the battery stack 10 in the stacking direction. Consequently, the battery pack 1 enabling reduction in cost and the method for producing such a battery pack 1 can be achieved.

Second Embodiment

Next, a second embodiment will be described below. In this embodiment, the battery pack further includes a separation-restraining structure capable of further reliably restraining a battery stack housed in a case member from separating therefrom. In the present embodiment, therefore, a part of the battery pack is different from that in the first embodiment. In the following description, different elements or parts from those in the first embodiment will be explained with different reference signs from those in the first embodiment, but the identical elements or parts to those in the first embodiment will be explained with the same reference signs as those in the first embodiment.

Figure 10:
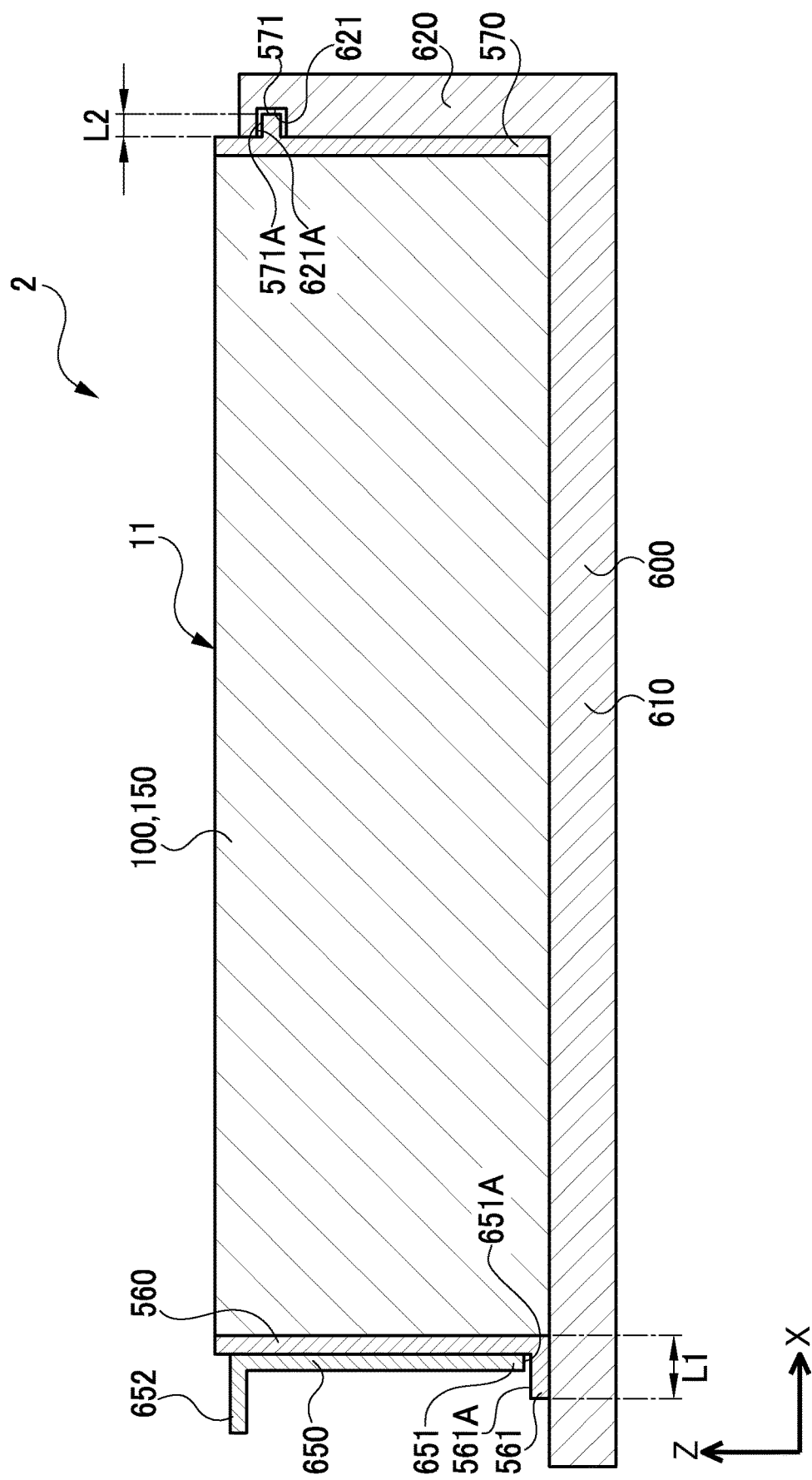
FIG. 10 is a schematic cross-sectional view of a battery pack in a second embodiment.

FIG. 10 is a schematic cross-sectional view of a battery pack 2 in the present embodiment. This battery pack 2 includes a battery stack 11, a case member 600, and an end panel 650.

The battery stack 11 includes two end plates 560 and 570, which are located at both ends in the stacking direction of the battery cells 100. In the present embodiment, those end plates are referred to as a first end plate 560 on the side close to the end panel 650 and a second end plate 570 on the side close to an end wall part 620 of the case member 600. Specifically, in the battery pack 2, the first end plate 560 and the end panel 650 are placed adjacent to each other. In the battery pack 2, the second end plate 570 and the end wall part 620 are placed adjacent to each other.

In the battery stack 11 in the present embodiment, a plurality of battery cells 100 are also stacked in the direction X between the first end plate 560 and the second end plate 570, the battery cells 100 are appropriately assembled with the spacers 150. This configuration is also identical to that in the first embodiment. In FIG. 10 and subsequent figures, the details of the battery cells 100 and the spacers 150 are omitted as the case may be.

The first end plate 560 is placed at a position closest to the end panel 650 in the battery stack 11. In other words, the first end plate 560 is positioned outside the battery cell 100 closest to the end panel 650 in the stacking direction of the battery cells 100 in the battery stack 11. The first end plate 560 is provided with first hook parts 561 protruding toward the end panel 650. These first hook parts 561 are provided in a lower part of the first end plate 560 on the side close to the end panel 650. As shown in FIG. 10, each first hook part 561 of the first end plate 560 has a length L1.

The end panel 650 is provided with first separation-restraining parts 651 that restrict upward movement of the adjacent first end plate 560. These first separation-restraining parts 651 are provided in a lower part of the end panel 650. The first separation-restraining, parts 651 are positioned above the first hook parts 561 of the first end plate 560. Thus, when the first end plate 560 moves upward, an upper surface 561A of each first hook part 561 of the first end plate 560 engages, i.e., abuts against, a lower surface 651A of each corresponding first separation-restraining part 651. This prevents the first end plate 560 from moving upward and further separating, or coming off, from the case member 600.

The second end plate 570 is placed at a position closest to the end wall part 620 in the battery stack 11. In other words, the second end plate 570 is positioned outside the battery cell 100 closest to the end wall part 620 in the stacking direction of the battery cells 100 in the battery stack 11. The second end plate 570 is provided with second hook parts 571 protruding toward the end wall part 620 to each serve as an engagement part engageable with a second separation-restraining part which will be mentioned later. As shown in FIG. 10, each second hook part 571 of the second end plate 570 has a length L2. In the present embodiment, the length L1 of each first hook part 561 of the first end plate 560 is longer than the length L2 of each second hook part 571 of the second end plate 570.

The end wall part 620 is provided with second separation-restraining parts 621 that restrict upward movement of the adjacent second end plate 570. The second separation-restraining parts 621 of the end wall part 620 each has a recessed shape conforming to each second hook part 571 of the second end plate 570. The second hook parts 571 of the second end plate 570 are inserted in the corresponding second separation-restraining parts 621 of the end wall part 620. The second separation-restraining parts 621 are provided in an upper part of the end wall part 620. When the second end plate 570 moves upward, the upper surfaces 571A of the second hook parts 571 of the second end plate 570 engage, i.e., abut against, the upper inner walls 621A of the recessed, second separation-restraining parts 621. This prevents the second end plate 570 from moving upward and further separating, or coming off, from the case member 600. The second hook parts 571 of the second end plate 570 and the second separation-restraining parts 621 of the end wall part 620 are located at a higher position than the first hook parts 561 of the first end plate 560 and the first separation-restraining parts 651 of the end panel 650.

Figure 11:
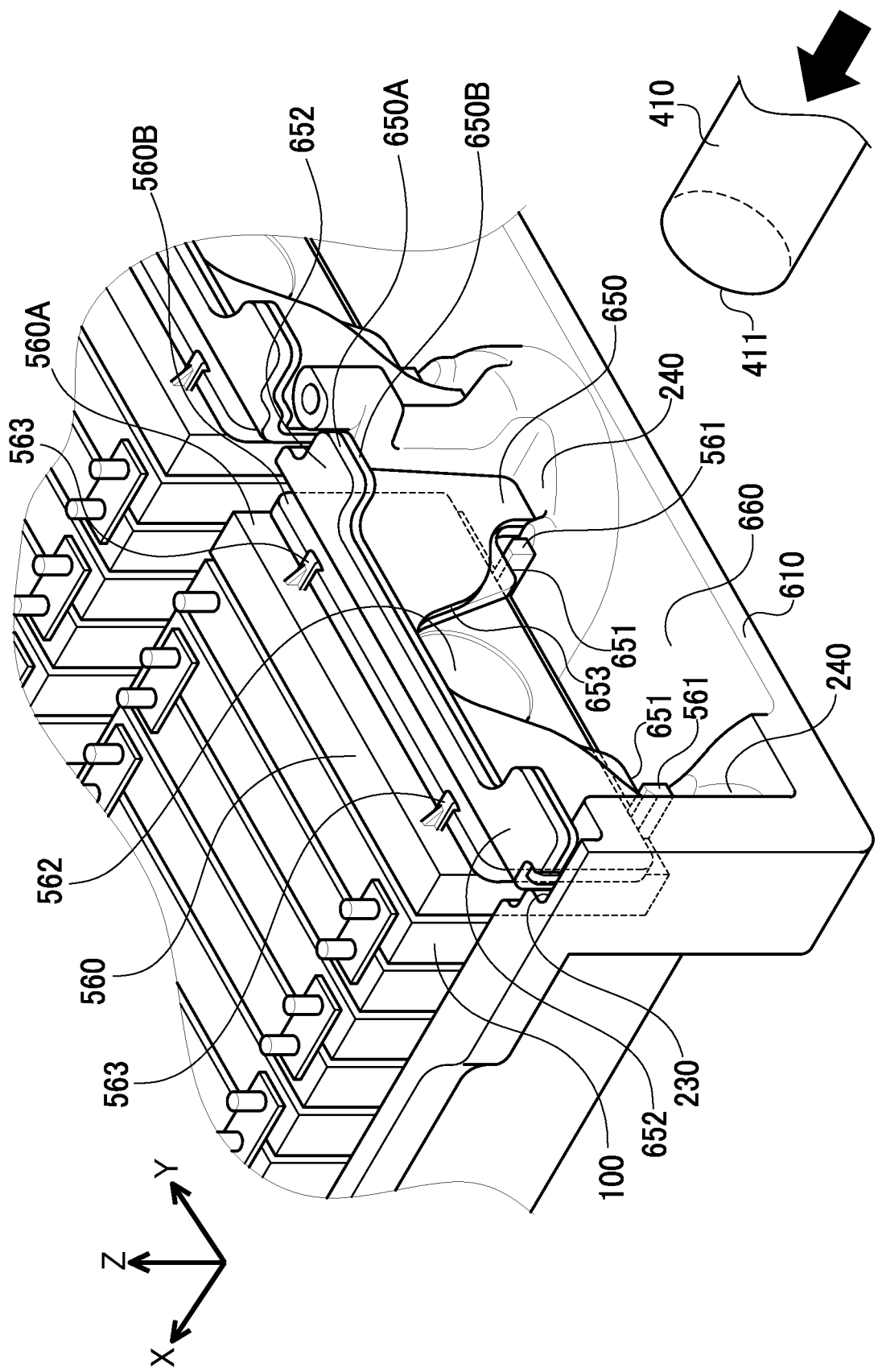
FIG. 11 is a perspective view of the battery pack, showing a first end plate, an end panel, and surroundings thereof, in the second embodiment.

FIG. 11 is a perspective partial view of the battery pack 2, showing the first end plate 560a, the end panel 650, and surroundings thereof. As shown in FIG. 11, the two first hook parts 561 are provided on the bottom of the first end plate 560. These first hook parts 561 are spaced at an interval in the width direction of the battery cells 100. The first end plate 560 includes a pressed part 562 on the side facing the end panel 650. This pressed part 562 is a portion that will be pressed by the end face 411 of the pressing unit 410, for example, when the battery stack 11 is compressed in the stacking direction of the battery cells 100.

The first end plate 560 in the present embodiment includes a main body 560A and a pressed plate 560B. This pressed plate 560B is located close to the end panel 650 relative to the main body 560A. The pressed part 562 is provided in the pressed plate 560B. The pressed plate 560B is held by the main body 560A with plate retainers 563 provided to the main body 560A. The plate retainers 563 in the present embodiment are snap-fit parts. The main body 560A may be made of, e.g., insulating resin. The pressed plate 560B has a higher strength than the main body 560A. The pressed plate 560B may be made of, e.g., metal.

The end panel 650 is attached by insertion from above into the mounting part 230 of the case member 600. This configuration is identical to that in the first embodiment. The end panel 650 is provided with two first separation-restraining parts 651. These two first separation-restraining parts 651 are spaced at positions corresponding the two first hook parts 561 of the first end plate 560. Similarly, the second hook parts 571 and the second separation-restraining parts 621 are arranged at respective two positions spaced in the width direction of the battery cells 100, as well as the first hook parts 561 and the first separation-restraining parts 651.

The end panel 650 in the present embodiment further includes upper surface portions 652 on the top. The upper surface portions 652 are subjected to downward pressure when the end panel 650 is inserted in the mounting part 230. The end panel 650 also includes an escape portion 653. This escape portion 653 is provided in a position corresponding to the pressed part 562 of the first end plate 560. The escape portion 653 has a cutout shape recessed from a lower end toward an upper end of the end panel 650. Thus, the end panel 650 can be mounted in the mounting part 230 while allowing the first end plate 560 to be pressed by the pressing unit 410.

The case member 600 in the present embodiment includes a floor part 610 provided, on its upper surface, with an air conduit 660. The air conduit 660 has a groove shape formed between two aligning grooves 240 in the width direction of the battery cells 100. The air conduit 660 extends from the end panel 650 to the end wall part 620. In the battery pack 2, air flows through the air conduit 660, thereby preventing a temperature rise of the battery cells 100.

In the present embodiment, the first separation-restraining parts 651 of the end panel 650 each have a cutout shape recessed from the lower end toward the upper end of the end panel 650. The first hook parts 561 are placed above the air conduit 660. This prevents the first hook parts 561 from interfering with a flow of air passing through the air conduit 660.

In the battery pack 2 in the present embodiment, a separation-restraining structure is achieved by the first hook parts 561, the second hook parts 571, the first separation-restraining parts 651, and the second separation-restraining parts 621, so that the battery stack 11 is prevented from separating from the case member 600. This structure will be described below.

Figure 12:
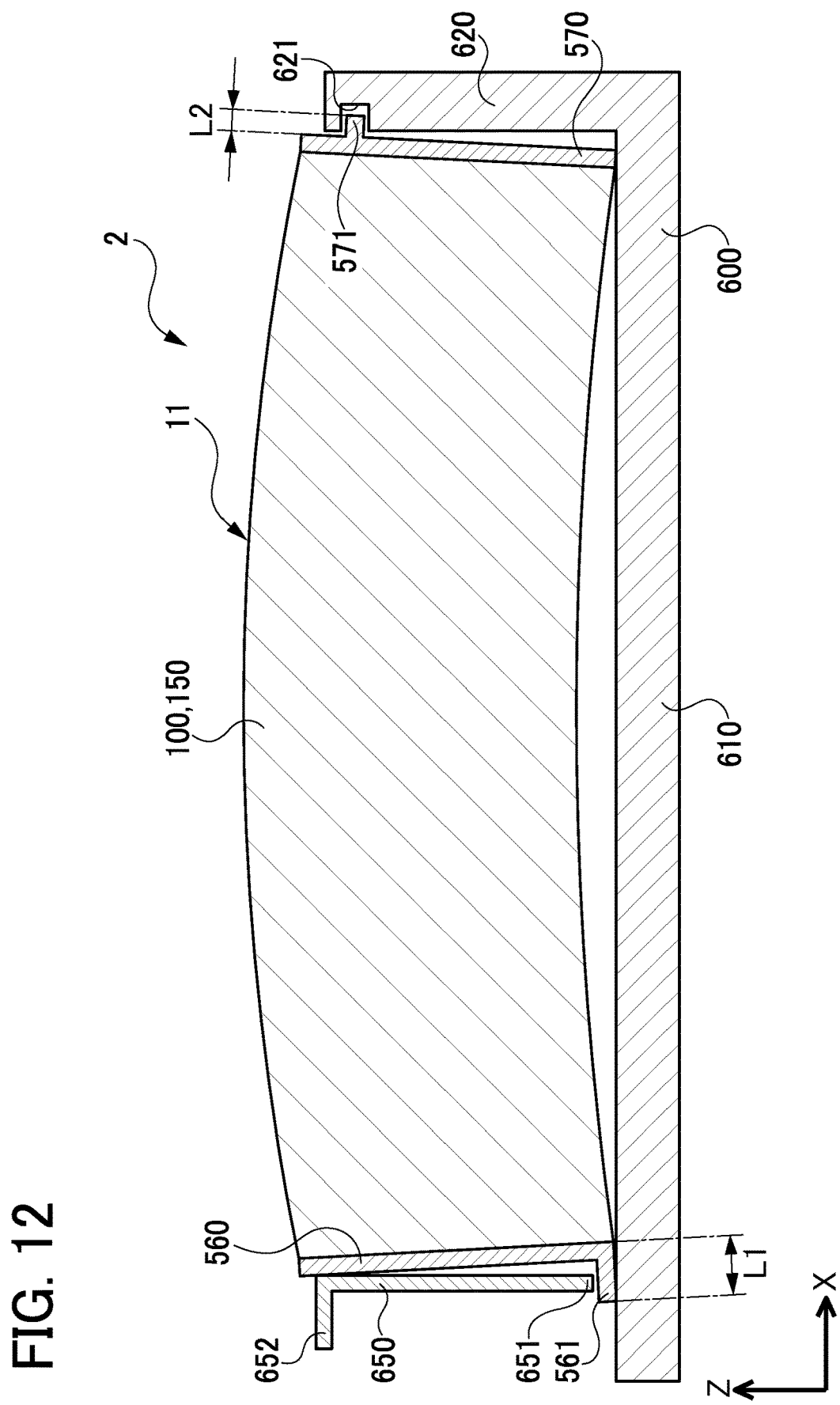
FIG. 12 is an explanatory diagram showing the reason why a battery stack is prevented from coming off a case member when the battery pack vibrates in the second embodiment.

When the battery pack 2 is installed in an electric car, for example, the battery pack 2 may vibrate in association with vibrations of the vehicle body of the electric car. This vibration of the battery pack 2 may deform the battery stack 11 so that its center portion, rather than other portions, in the stacking direction of the battery cells 100 more greatly separates from the floor part 610 of the case member 600 as shown in FIG. 12. This is because the battery stack 11 is sandwiched between the end wall part 620 and the end panel 650 and housed in the case member 600.

If the battery stack 11 is deformed with its center portions in the stacking direction of the battery cells 100 separating from the floor part 610 of the case member 600 more than the other portions, a gap is generated between the first end plate 560 and the end panel 650. Alternatively, even if the deformation of the battery stack 11 due to vibration is not large enough to generate a gap between the first end plate 560 and the end panel 650, the pressure (surface pressure) that the first end plate 560 and the end panel 650 press against each other will decrease. If the gap is generated between the first end plate 560 and the end panel 650, or alternatively, if their pressure pushing each other decreases, the frictional force between the first end plate 560 and the end panel 650 will become low. In case the frictional force is low between the first end plate 560 and the end panel 650, the first end plate 560 may possibly move upward relative to the end panel 650.

When the battery stack 11 is deformed as above, with the center portion in the stacking direction of the battery cells 100 separating from the floor part 610 of the case member 600 more than the other portions, the second end plate 570 may also move upward relative to the end wall part 620. The upward moving of the first end plate 560 and the second end plate 570 may possibly cause the battery stack 11 to come off the case member 600.

In the present embodiment, the above-mentioned problems can be prevented by arrangement of the first hook parts 561, the second hook parts 571, the first separation-restraining parts 651, and the second separation-restraining parts 621. Specifically, in case the first end plate 560 moves upward relative to the end panel 650, as shown in FIG. 12, the first hook parts 561 of the first end plate 560 engage the first separation-restraining parts 651 of the end panel 650. Accordingly, the first end plate 560 is suppressed from upward movement relative to the end panel 650.

Further, in case the second end plate 570 moves upward relative to the end wall part 620, as shown in FIG. 12, the second hook parts 571 of the second end plate 570 engage the second separation-restraining parts 621 of the end wall part 620. Accordingly, the second end plate 570 is suppressed from upward movement relative to the end wall part 620. In the present embodiment, therefore, the battery stack 11 is restrained from separating from the case member 600.

Moreover, when the gap is generated between the second end plate 570 and the end wall part 620 due to deformation of the battery stack 11 caused by vibration of the battery pack 2, the gap tends to be wider downward. The second hook parts 571 and the second separation-restraining parts 621 are respectively provided in the upper part of the second end plates 570 and the upper part of the end wall part 620. In other words, the second hook parts 571 and the second separation-restraining parts 621 are provided at positions where a gap between the second end plate 570 and the end wall part 620 is small. Thus, the second hook parts 571 and the second separation-restraining parts 621 may have a short length in the stacking direction of the battery cells 100.

In contrast, the end panel 650 is preferably provided with the first separation-restraining parts 651 in the lower part for the following reason. As described above, the end panel 650 is assembled to the case member 600 by being moved down from above. In assembling of the end panel 650, it is thus necessary to provide appropriate passages, or spaces, under the first separation-restraining parts 651 to allow the first hook parts 561 to extend therethrough. The higher the first separation-restraining parts 651 are located, the lower the strength and rigidity of the end panel 650. In light of this condition, in the present embodiment, the first separation-restraining parts 651 are arranged in the lower part of the end panel 650.

Further, in association with the first separation-restraining parts 651 being provided in the lower part of the end panel 650, the first hook parts 561 are also provided in the lower part of the first end plate 560. The lower parts of those end panel 650 and first end plate 560 are located in an area where a gap generated between the first end plate 560 and the end panel 650 when the battery stack 11 is deformed due to vibration tends to be wider than in the upper parts. Therefore, the first hook parts 561 located in the lower part are designed with the length L1 longer than the length L2 of the second hook parts 571 in the stacking direction of the battery cells 100. Accordingly, even if the gap is generated between the first end plate 560 and the end panel 650, the first hook parts 561 can reliably engage the first separation-restraining parts 651.

In the present embodiment, the first separation-restraining parts 651 each have a cutout shape recessed upward from the lower end of the end panel 650. That is, the first separation-restraining parts 651 are positioned slightly above the lower end of the end panel 650. Thus, the first hook parts 561 can be positioned as high as possible, even if only slightly.

Figure 13:
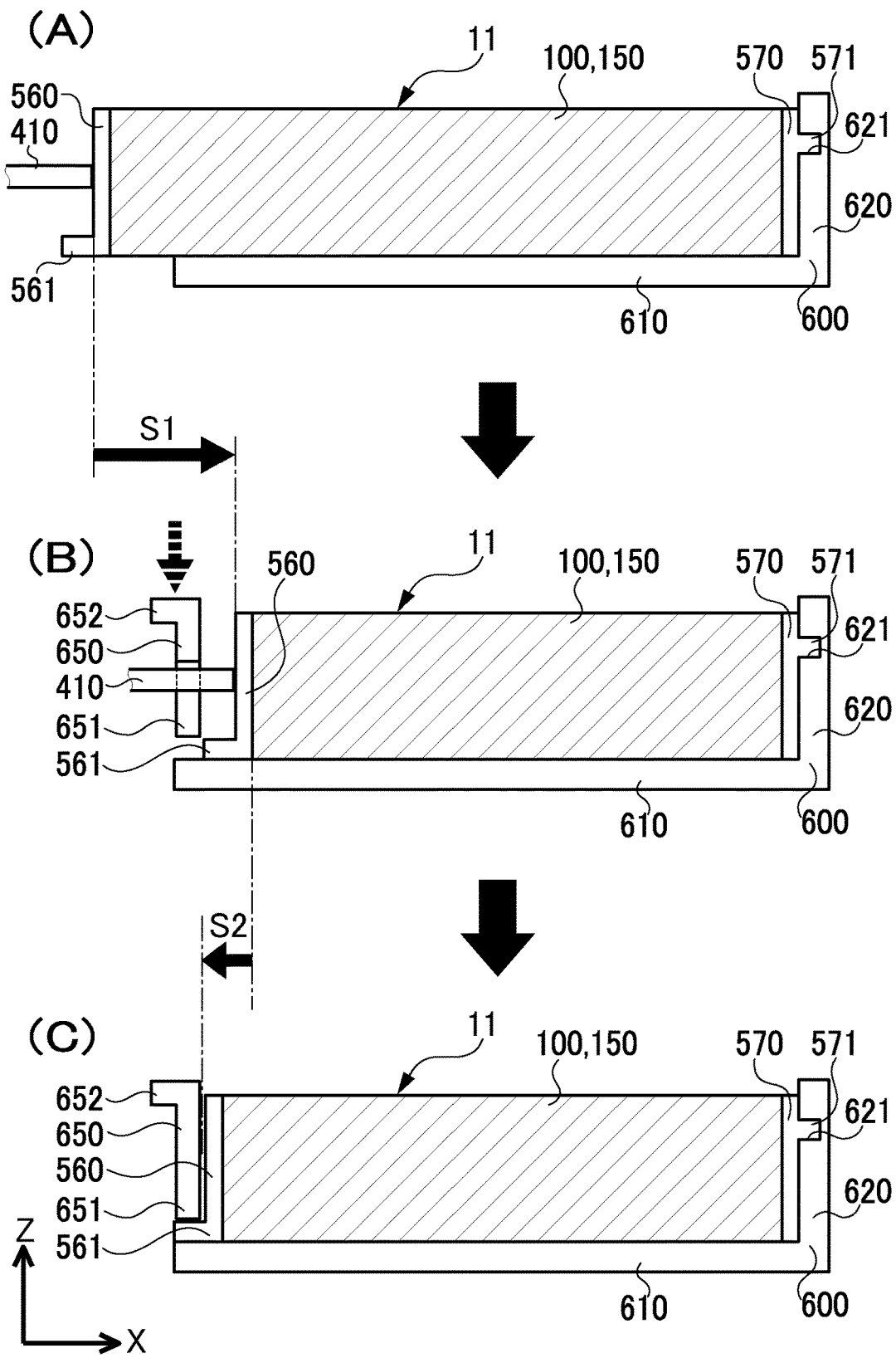
FIG. 13 is a schematic diagram showing a method for producing the battery pack in the second embodiment.

FIG. 13 is a schematic diagram showing a method for producing the battery pack 2. In producing the battery pack 2, firstly, the battery stack 11 is inserted into the case member 600 so that the lower surface of the battery stack 11 is guided along the floor part floor part 610 as shown in FIG. 13(A), which illustrates a non-compressed state of the battery stack 11.

Successively, as shown in FIG. 13(B), the end panel 650 is mounted in the mounting part 230 of the case member 600 while compressing the battery stack 11 in the stacking direction of the battery cells 100. Compressing the battery stack 11 is performed by pressing the first end plate 560 toward the end wall part 620 by use of the pressing unit 410. Mounting the end panel 650 can be performed by pressing the upper surface portion 652 from above. The position of the end panel 650 mounted as above can be selected according to the length of the battery stack 11 in a compressed state as in the first embodiment.

Subsequently, as shown in FIG. 13(C), the battery stack 11 is released from compression, so that the battery stack 11 is sandwiched between the end wall part 620 and the end panel 650. Thus, the battery stack 11 is held in the case member 600. Further, the end panel 650 is fixed by compression reaction force of the battery stack 11. In the present embodiment, as shown in FIG. 13, the battery pack 2 can be produced in the same steps as in the first embodiment.

FIG. 13 shows the distances S1 and S2 related to the total length of the battery stack 11 that can change in the stacking direction of the battery cells 100 in producing the battery pack 2. The distance S1 is a compression distance that indicates a difference between the total length of the battery stack 11 in a non-compressed state and the total length of the battery stack 11 in a compressed state. The distance S2 is a compression-release distance that indicates the total length of the battery stack 11 in the compressed state and the total length of the battery stack 11 released from compression and housed in the case member 600. In other words, in the process of production, the total length of the battery stack 11 decreases by the compression distance S1 from the non-compressed state when the battery stack 11 is compressed, and then the total length of the battery stack 11 increases by the compression-release distance S2 from the compressed state when the battery stack 11 is released from compression.

Figure 14:
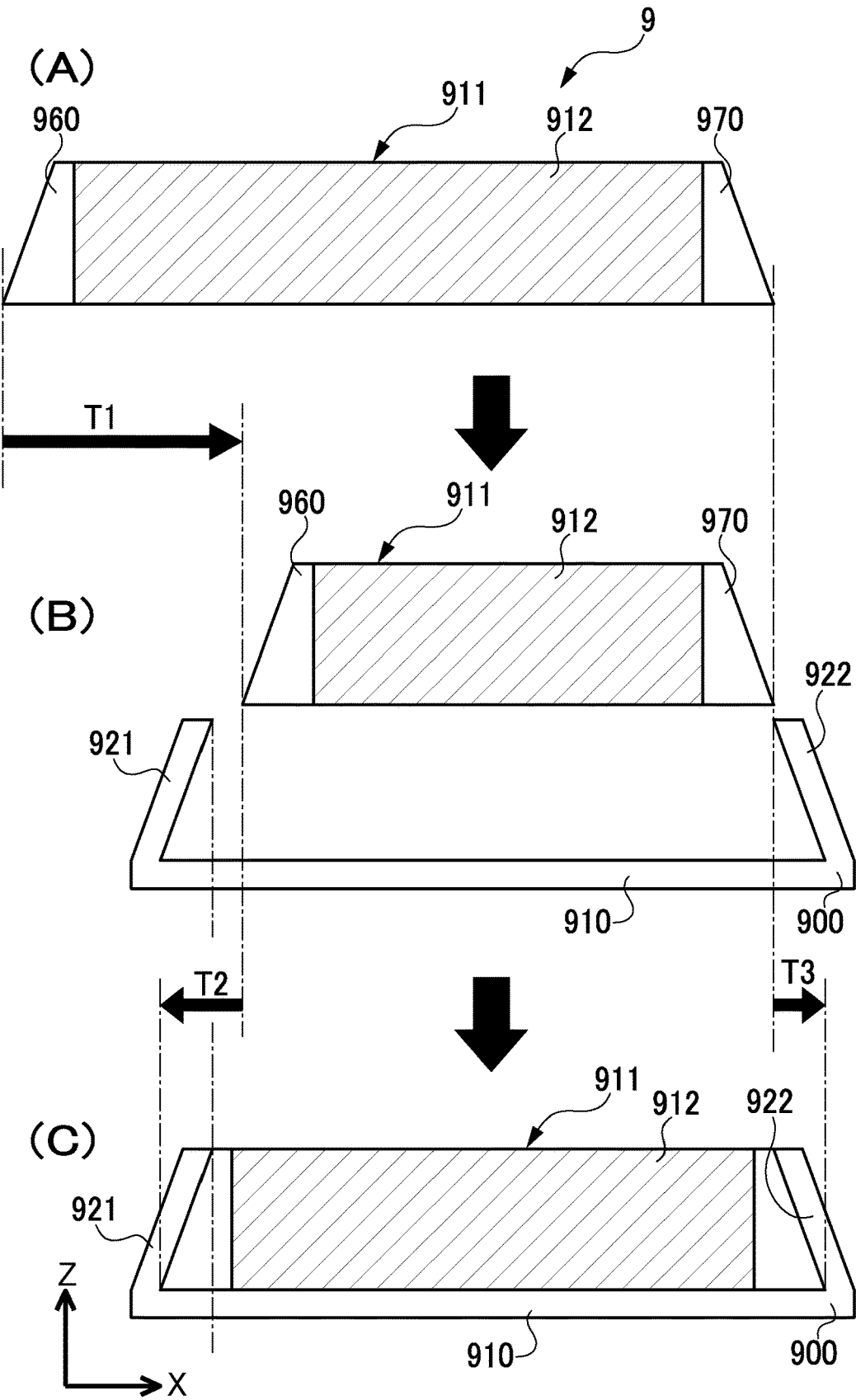
FIG. 14 is a schematic diagram showing a method for producing a battery pack in a comparative example compared to the battery pack in the second embodiment.

FIG. 14 shows a battery pack 9 in a comparative example with respect to the battery pack 2 in the present embodiment. The battery pack 9 is configured for example as described in Japanese unexamined patent application publication No. 2020-095895. The battery pack 9 is identical to the battery pack 2 in the present embodiment in that a battery stack 911 is prevented from separating from a case member 900. Further, the battery pack 9 is identical to the battery pack 2 in the present embodiment in the production method in which the battery stack 911 is compressed and put into the case member 900 and then the battery stack 911 is released from compression and retained in the case member 900.

To be specific, the battery stack 911 of the battery pack 9 includes a plurality of battery cells 912 stacked in a lateral direction in FIG. 14. The battery stack 911 includes, as shown in FIG. 14(A), a first end plate 960 at one end in the stacking direction of the battery cells 912 and a second end plate 970 at the other end. The first end plate 960 and the second end plate 970 each have a shape including an inclined surface sloping outward in the stacking direction of the battery cells 912 so that a lower portion of each plate is wider.

The case member 900 includes a floor part 910 under the battery stack 911, and a first end wall part 921 and a second end wall part 922 at both ends of the floor part 910 in the stacking direction of the battery cells 912. The first end wall part 921 and the second end wall part 922 each have the outwardly inclined cross-sectional shape with its lower portion wider in the stacking direction of the battery cells 912. Furthermore, the distance between the upper end of the first end wall part 921 and the upper end of the second end wall part 922 in the stacking direction of the battery cells 912 is shorter than the total length of the battery stack 911 in the non-compressed state shown in FIG. 14(A).

The battery stack 911 is put in the case member 900 by changing the battery stack 911 from the non-compressed state shown in FIG. 14(A) to the compressed state shown in FIG. 14(B). Thus, the battery pack 9 is produced. The total length of the battery stack 911 in the compressed state in the stacking direction of the battery cells 912 is shorter than the distance between the upper end of the first end wall part 921 and the upper end of the second end wall part 922. Further, the battery stack 911 in the compressed state is inserted into the case member 900 by passing between the first end wall part 921 and the second end wall part 922. Then, the battery stack 911 is released from the compressed state and, as shown in FIG. 14(C), the battery stack 911 is housed in the case member 900. The length of the lower part of the battery stack 911 in the stacking direction of the battery cells 912 is longer than the distance of the upper end of the first end wall part 921 and the upper end of the second end wall part 922. In the battery pack 9, therefore, the battery stack 911 is prevented from separating from the case member 900.

FIG. 14 also shows the distances T1, T2, and T3 related to the total length of the battery stack 911 that changes in the stacking direction of the battery cells 912 in producing the battery pack 9. The distance T1 is a compression distance that indicates a difference between the total length of the battery stack 911 in the non-compressed state and the total length of the battery stack 911 in the compressed state. The distance T2 is a moving distance of the first end plate 960 moved from the compressed state of the battery stack 911 when released therefrom until the first end plate 960 comes into contact with the first end wall part 921. The distance T3 is a moving distance of the second end plate 970 moved from the compressed state of the battery stack 911 when released therefrom until the second end plate 970 comes into contact with the second end wall part 922. Therefore, the sum of the distance T2 and the distance T3 is a compression-release distance that indicates a difference between the total length of the battery stack 911 in the compressed state and the total length of the battery stack 911 released from the compression and housed in the case member 900. In other words, in the process of production, the total length of the battery stack 911 decreases by the compression distance T1 from the non-compressed state when the battery stack 911 is compressed, and then the total length of the battery stack 911 increases by the sum of the distances T2 and T3 from the compressed state when the battery stack 911 is released from compression.

In comparison of changes in the total length during the process of production between the battery pack 2 in the present embodiment and the battery pack 9 in the comparative example, the battery pack 2 in the present embodiment can be produced with a smaller change amount. Specifically, the compression distance S1 of the battery pack 2 in the present embodiment is shorter than the compression distance T1 of the battery pack 9 in the comparative example. Furthermore, the compression-release distance S2 of the battery pack 2 in the present embodiment is shorter than the sum of the distances T2 and T3, corresponding the compression-release distance in the comparative example.

Therefore, the battery pack 2 in the present embodiment configured as above can adapt to a greater variety of battery stacks as compared with the battery pack 9 in the comparative example. To be specific, the battery pack 9 in the comparative example configured as above can only adapt to the battery stack 911 that can be greatly shortened, i.e., shrunk, in total length. In other words, for example, if the battery stack 911 is constituted of the battery cells 912 that are not easily deformed in the stacking direction, the battery stack 911 may not fit into the case member 900. In contrast, the battery pack 2 in the present embodiment configured as above can also adapt to the battery stack 11 that cannot be shortened, i.e., shrunk, so much in total length.

In the comparative example, to more reliably suppress separation of the battery stack 911 from the case member 900 in the battery pack 9, the distance between the upper end of the first end wall part 921 and the upper end of the second end wall part 922 has to be set shorter. In the comparative example, specifically, unless the battery pack 9 adopts the battery stack 911 that can be shortened in total length, it may be impossible to reliably restrain the battery stack 911 from separation from the case member 900.

In contrast, in the present embodiment, to more reliably restrain separation of the battery stack 11 from the case member 600 in the battery pack 2, the the length L1 of the first hook part 561 and the length L2 of the second hook part 571 have to be set longer. In particular, since the first end plate 560 and the end panel 650 are respectively provided, at their bottoms, with the first hook parts 561 and the first separation-restraining parts 651, the length L1 of each first hook part 561 needs to be somewhat long, as described above. In the battery pack 2 configured as above in the present embodiment, however, even if the length L1 of the first hook parts 561 and the length L2 of the second hook parts 571 are set longer, the amount of change in the total length of the battery stack 11 is unchanged in inserting the battery stack 11 in the case member 600. In other words, even when the battery stack 11 that cannot be shortened in total length so much is adopted, the length L1 of the first hook parts 561 can be sufficiently set long.

According to the present embodiment described in detail above, the battery stack 11 of the battery pack 2 includes the first end plate 560 and the second end plate 570. The first end plate 560 and the second end plate 570 are each located outside the endmost battery cells 100 arranged at the both ends in the stacking direction of the battery cells 100. Further, the end panel 650 is provided, in its lower part, with the first separation-restraining parts 651 configured to restrain the adjacent first end plate 560 from moving upward and further separating from the case member 600. The first end plate 560 is provided with the first hook parts 561 that engage the first separation-restraining parts 651 when the first end plate 560 moves upward. In producing the battery pack 2, the end panel 650 is mounted to the mounting part 230 in such a way that the end panel 650 with the first separation-restraining parts 651 facing downward is moved down from above the mounting part 230. In the battery pack 2 produced as above, the first end plate 560 is restrained from moving upward and thus separating from the case member 600. This can reduce production costs and achieve the battery pack 2 with the battery stack 11 appropriately restrained from separation from the case member 600 and the producing method thereof.

According to the present embodiment, furthermore, the end wall part 620 is provided with the second separation-restraining parts 621 that restrain the adjacent second end plate 570 from moving upward and thus separating from the case member 600. The second separation-restraining parts 621 are located at a higher position than the first separation-restraining parts 651. The second end plate 570 is provided with the second hook parts 571 that can engage the second separation-restraining parts 621 when the second end plate 570 moves upward. The length L1 of the first hook parts 561 is longer than the length L2 of the second hook parts 571 in the stacking direction of the battery cells 100 of the battery stack 11. In the battery pack 2, therefore, the second end plate 570 is also restrained from moving upward and thus separating from the case member 600. Consequently, the battery pack 2 and the producing method thereof can be achieved in which separation of the battery stack 11 from the case member 600 is more reliably restrained.

Third Embodiment

A third embodiment will be described below. This embodiment provides a configuration that can appropriately restrain a battery stack housed in a case member from separating the case member, as in the second embodiment. In the third embodiment, however, depending on the entire structure of a battery pack, out of the end plates arranged at the both ends of the stacking direction of the battery cells, one end plate more susceptible to vibration is provided with a separation-restraining structure. In the present embodiment, part of the battery pack is different from those in the foregoing embodiments. In the following description, different elements or parts from those in the foregoing embodiments will be explained with different reference signs from those in the foregoing embodiments, but identical elements or parts to those in the foregoing embodiments will be explained with the same reference signs as those in the foregoing embodiments.

Figure 15:
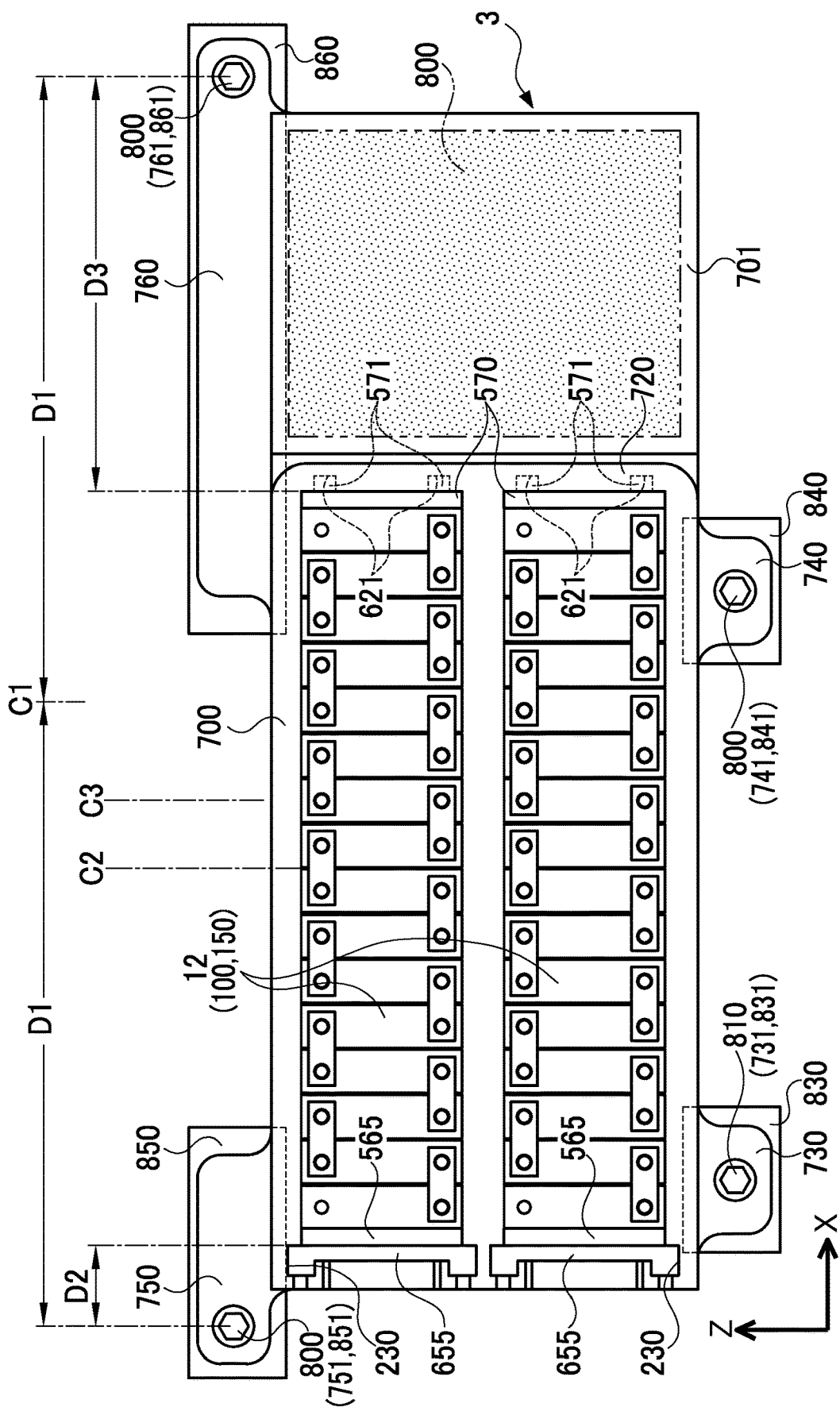
FIG. 15 is a plan view of a battery pack in a third embodiment.

FIG. 15 is a plan view of a battery pack 3 in the third embodiment. This battery pack 3 includes battery stacks 12, a case member 700, end panels 655, and an attached device 800.

The battery stack 12 includes first end plates 565 at one end close to the end panels 655 in the stacking direction of the battery cells 100. The battery stack 12 further includes the second end plates 570 at the other end, close to an end wall part 720 of the case member 700 in the stacking direction of the battery cells 100. Unlike the second embodiment, the first end plates 565 are not provided with hook parts, but the first end plates 565 have the same configuration as that in the second embodiment, except that it is provided with no hook part. The second end plates 570 are the same as those in the second embodiment described above. That is, each of the second end plates 570 is provided with the second hook parts 571. The battery stacks 12 are identical in configuration and thus only one thereof will be described below.

In the case member 700, the region for housing the battery stack 12 is identical to that in the second embodiment. Specifically, the end wall part 720 is provided with the second separation-restraining parts 621 that can engage the second hook parts 571 of the second end plate 570, thereby restraining the second end plate 570 from moving upward and further separating from the case member 700. In the mounting part 230 of the case member 700, the end panel 655 is mounted. This end panel 655 is not provided with a separation-restraining part, unlike the second embodiment. The end panel 655 is identical to that in the second embodiment, except that it is provided with no separation-restraining part.

The case member 700 includes an attachment region 701 in addition to the configuration in the second embodiment. The attachment region 701 is provided on the opposite side from the battery stack 12 relative to the end wall part 720. On the attachment region 701, the attached device 800 is mounted. This attached device 800 includes a control unit for executing for example control of charging and discharging the battery stack 12, retrieval of information related to the battery stack 12 and output thereof to an external unit, and others. The attached device 800 is lighter in weight than the battery stack 12. In the battery pack 3, the weight of the battery stack 12 accounts for a high proportion of the overall weight.

The case member 700 further includes a first installation part 730, a second installation part 740, a third installation part 750, and a fourth installation part 760. The case member 700 in the present embodiment is placed on and fixed to a first base part 830, a second base part 840, a third base part 850, and a fourth base part 860. These first base part 830, second base part 840, third base part 850, and fourth base part 860 are parts of an external structure connected with the battery pack 3. The first installation part 730, second installation part 740, third installation part 750, and fourth installation part 760 are respectively placed on, in contact with, the first base part 830, second base part 840, third base part 850, and fourth base part 860.

The first installation part 730, second installation part 740, third installation part 750, and fourth installation part 760 respectively include fixed parts 731, 741, 751, and 761, each of which is formed with a through hole. Further, the first base part 830, second base part 840, third base part 850, and fourth base part 860 respectively include fixing parts 831, 841, 851, and 861, each of which is formed with a screw hole located corresponding to the fixed part 731, 741, 751, or 761. Accordingly, the fixed parts 731, 741, 751, and 761 are respectively fastened to the fixing parts 831, 841, 851, and 861 with bolts bolt 810.

The first installation part 730 and the second installation part 740 are provided in one of outer edges of the case member 700 in the width direction of the battery cells 100. The fixed part 731 of the first installation part 730 and the fixed part 741 of the second installation part 740 are located at different positions in the stacking direction of the battery cells 100. The third installation part 750 and the fourth installation part 760 are provided in the opposite outer edge in the width direction of the battery cells 100 from the first installation part 730 and the second installation part 740. The fixed part 751 of the third installation part 750 and the fixed part 761 of the fourth installation part 760 are located at different positions in the stacking direction of the battery cells 100.

The fixed part 731 of the first installation part 730 and the fixed part 741 of the second installation part 740 are located near the heavy battery stack 12. In contrast, the fixed part 751 of the third installation part 750 and the fixed part 761 of the fourth installation part 760 are located more distant from the battery stack 12. Furthermore, comparing between the fixed part 751 of the third installation part 750 and the fixed part 761 of the fourth installation part 760, the fixed part 761 of the fourth installation part 760 is located more distant from the battery stack 12. The third installation part 750 continuously extends from the fixed part 751 to the vicinity of the battery stack 12. The fourth installation part 760 continuously extends from the fixed part 761 to the vicinity of the battery stack 12. Accordingly, when the case member 700 is fixed to the external structure through the fixed parts 731, 741, 751, and 761, the first installation part 730, second installation part 740, third installation part 750, and fourth installation part 760 can appropriately support the heavy battery stack 12.

Among the fixed parts 731, 741, 751, and 761, the fixed part 751 of the third installation part 750 and the fixed part 761 of the fourth installation part 760 are positioned at both ends, i.e., the farthest ends, in the stacking direction of the battery cells 100. FIG. 15 describes a midpoint C1 between the the fixed part 751 of the third installation part 750 and the fixed part 761 of the fourth installation part 760, which are located at both ends in the stacking direction of the battery cells 100. The midpoint C1 is the position to which the distance from the fixed part 751 of the third installation part 750 and the distance from the fixed part 761 of the fourth installation part 760 in the stacking direction of the battery cells 100 are the same distance D1.

The battery pack 3 may fall out of balance between the center of gravity and the arrangement of the fixed locations due to various factors. In the battery pack 3, the attached device 800 is mounted and thus the placement of the battery stack 12 in the battery pack 3 is deviated to one side. In the battery pack 3, as shown in FIG. 15, the battery stack 12 is located on the side close to the fixed part 751 of the third installation part 750, while the attached device 800 is located on the side close to the fixed part 761 of the fourth installation part 760.

FIG. 15 further describes the gravity center C2 of the battery stack 12 in the stacking direction of the battery cells 100 and the gravity center C3 of the battery pack 3 in the stacking direction of the battery cells 100. The gravity center C3 of the battery pack 3 is located eccentrically toward the gravity center C2 of the heavy battery stack 12 with respect to the midpoint C1 between the fixed part 751 of the third installation part 750 and the fixed part 761 of the fourth installation part 760. In other words, out of the fixed part 751 of the third installation part 750 and the fixed part 761 of the fourth installation part 760, the fixed part 751 of the third installation part 750 is an eccentric-side fixed part located closer to the gravity center C3 of the battery pack 3 with respect to the midpoint C1, that is, located on an eccentric side of the gravity center C3.

Furthermore, FIG. 15 shows the distance D2 between the end panel 655 and the fixed part 751 of the third installation part 750 in the stacking direction of the battery cells 100. This distance D2 is a distance from the end panel 655 to the one closer to the end panel 655, out of the fixed part 751 of the third installation part 750 and the fixed part 761 of the fourth installation part 760, which are located at both ends. FIG. 15 further shows the distance D3 between the end wall part 720 and the fixed part 761 of the fourth installation part 760 in the stacking direction of the battery cells 100. This distance D3 is a distance from the end wall part 720 to the one closer to the end wall part 720, out of the fixed part 751 of the third installation part 750 and the fixed part 761 of the fourth installation part 760, which are located at both ends.

In the above-configured battery pack 3, out of the first end plate 565 and the second end plate 570, the second end plate 570 is more susceptible to vibration if the battery pack 3 vibrates, and likely to move in a direction to separate from the case member 700. This is because, in the battery pack 3, the position of the second end plate 570 is prone to greater acceleration in association with vibration as compared with the position of the first end plate 565. In the present embodiment, therefore, the second end plate 570, which tends to move under the influence of vibration of the battery pack 3, is provided with the separation-restraining structure. Specifically, the end wall part 720 adjacent to the second end plate 570 is provided with the second separation-restraining parts 621 and further the second end plate 570 is provided with the second hook parts 571.

According to the present embodiment described in detail above, the battery stack 12 of the battery pack 3 includes the first end plate 565 and the second end plate 570. The first end plate 565 and the second end plate 570 are each located outside the endmost battery cells 100 arranged at both ends in the stacking direction of the battery cells 100. The case member 700 includes the fixed parts 751 and 752 which are respectively fixed to the external fixing parts 851 and 861. The fixed parts 751 and 752 are each located at either end in the stacking direction of the battery cells 100. The gravity center C3 of the battery pack 3 is located closer to the fixed part 751 corresponding to the eccentric-side fixed part relative to the midpoint C1 between the fixed parts 751 and 761 in the stacking direction of the battery cells 100. The end wall part 720 is provided with the second separation-restraining parts 621 that restrain the adjacent second end plate 570 from moving upward and further coming off the case member 700. Furthermore, the second end plate 570 is provided with the second hook parts 571 that engage the second separation-restraining parts 621 when the second end plate 570 moves upward. Out of the end wall part 720 and the end panel 655, the end wall part 720 is positioned more distant from the fixed part 751 in the stacking direction of the battery cells 100. In other words, if the battery pack 3 vibrates, the second end plate 570 adjacent to the end wall part 720 is liable to move under the influence of vibration. The battery pack 3 configured as above can however prevent the second end plate 570 susceptible to vibration from slipping out from the case member 700. Consequently, the present embodiment can reduce production costs and also achieve the battery pack 3 with the battery stack 12 appropriately restrained from separation from the case member 700.

The foregoing embodiments and examples are merely exemplified and give no limitation to the present disclosure. The present disclosure may be embodied in other specific forms without departing from the essential characteristics thereof.

For example, in the first embodiment, the mounting-shape part in which the end panel is to be mounted is configured with three grooves, namely, the first mounting-shape part 231, the second mounting-shape part 232, and the third mounting-shape part 233. However, the number and the shape of mounting-shape parts may be changed as needed.

In the first embodiment, the mounting-shape part in which the end panel 250 is to be mounted is selected as one located at the position where the interval between the battery stack 10 in the compressed state and the end plate 160 is the smallest. As an alternative, the mounting-shape part in which the end panel 250 is to be mounted has only to be located at a position where the battery stack 10 in the battery pack 1 can be compressed to a desired degree. Specifically, the relationship between the position of the mounting-shape part for mounting the end panel 250 and the length of the compressed battery stack 10 in the stacking direction can be determined in advance. Accordingly, in producing the battery pack 1, the length of the compressed battery stack 10 in the stacking direction is detected and, referring to the above predetermined relationship, the position of the mounting-shape part for mounting the end panel 250 is determined based on a detection value indicating the detected length of the compressed battery stack 10. In other words, the mounting-shape part in which the end panel 250 is to be mounted is any mounting-shape part, which is at least partly hidden by the battery stack 10 in the non-compressed state, whereas is exposed when the battery stack 10 is in the compressed state.

The first embodiment shows the configuration that each spacer 150 of the battery stack 10 is provided with the aligning protrusions 155 and correspondingly the floor part 210 of the case member 200 is provided with the aligning grooves 240. An alternative may be configured, for example, such that the spacers 150 are each provided with a groove or grooves and correspondingly the floor part 210 is provided with a protrusion or protrusions. The part of the battery stack 10, which fits with the shape of the floor part 210, has only to be positioned with the battery cells 100 in the width direction and may be provided to any components other than the spacers 150. Specifically, it is only necessary that the floor part 210 of the case member 200 is formed with an aligning-shape part for aligning the battery cells 100 of the battery stack 10, while the battery stack 10 includes an engagement member together with the battery cells 100 to fit with the aligning-shape part.

Figure 16:
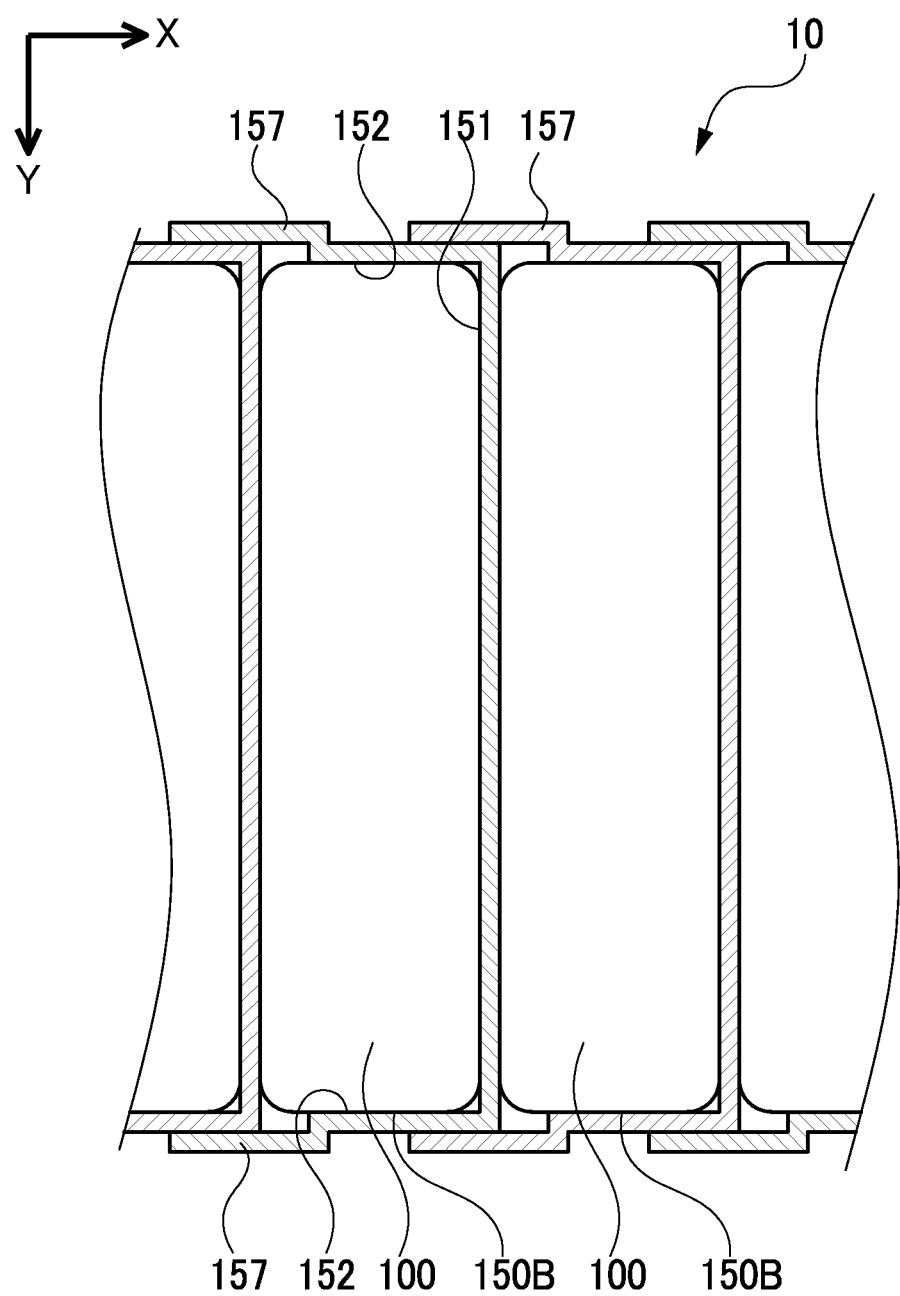
FIG. 16 is an explanatory view showing a modified example of a structure of the battery stack.

The first embodiment exemplifies that the battery cells 100 of the battery stack 10 are aligned in the equipment before insertion into the case member 200. Alternatively, the battery cells 100 of the battery stack 10 may be aligned by the configuration of the battery stack 10 itself before insertion in the case member 200. A concrete example of such an additional configuration of the battery stack 10 that can align the battery cells 100 is illustrated in FIG. 16. FIG. 16 is a cross-sectional view of the battery stack 10, horizontally taken, including spacers 150B in a modified example. Each spacer 150B has the same shape as the spacer 150 and additionally includes positioning parts 157. Each positioning part 157 extends to an adjacent spacer 150B in the battery stack 10 so that the adjacent spacer 150B is fitted in the positioning spacers 157. The spacers 150B can thus position the battery cells 100 each assembled to the corresponding recessed portion 151 and the adjacent spacers 150B in the width direction. The adjacent battery cells 100 can therefore be aligned with each other in the stacking direction. Each spacer may be configured to allow the battery cells 100 at both sides of each spacer to be fitted in the relevant spacer from both sides thereof.

The second and third embodiments described above show the configuration that the end wall part of the case member is provided with a recess as the separation-restraining part, and the second end plate is provided with a protrusion as the hook part serving as an engagement part engageable with the separation-restraining part. As an alternative, the end wall part may be provided with a protrusion as the separation-restraining part, and the second end plate is provided with a recess as the hook part serving as an engagement part engageable with the separation-restraining part.

In the third embodiment described above, the battery pack in which the second end plate, out of end plates located at both ends in the stacking direction of the battery cells, is placed at a position where it is more susceptible to vibration compared with the other. As an alternative, if the first end plate is placed at a position where it is more susceptible to vibration than the second end plate, that is, if the end wall part and the end panel are placed in reversed positions from those in FIG. 15, the first end plate is preferably provided with the separation-restraining part structure.

The foregoing embodiment may be applied to any types of batteries (nickel metal hydride battery, lithium-ion battery, etc.) without particular limitations.

The battery pack according to the present disclosure may be configured such that the mounting-shape part of the case member includes a plurality of mounting-shape parts that are located at a plurality of positions on the opposite end of the case member from the end wall part, and the end panel is mounted in one of the plurality of mounting-shape parts. With this configuration, the position of the end panel is appropriately adjusted according to individual differences among battery stacks in the length in the stacking direction. No special components and processes are required to adjust the position of the end panel according to the individual differences among battery stacks in the length in the stacking direction. Therefore, even when the battery stacks have large individual differences in the length in the stacking direction, the battery pack including such battery stacks is produced at low costs.

Furthermore, the battery pack according to the present disclosure may be configured such that the floor part includes an aligning-shape part configured to align the battery cells of the battery stack in the stacking direction, and the battery stack further includes an engagement member for each of the battery cells, the engagement member being configured to engage with the aligning-shape part. With the above configuration, the battery pack can be configured with the battery cells aligned in the stacking direction with an inexpensive structure using the aligning-shape part and the engagement member.

The battery pack according to the present disclosure may be configured such that the battery stack includes end plates located outside the battery cells arranged at both ends in the stacking direction, the end plates include a first end plate located adjacent to the end panel, the end panel is provided, in a lower part, with a first separation-restraining part configured to restrain the first end plate from moving upward and further coming off the case member, and the first end plate is provided with a first hook part that engages the first separation-restraining part when the first end plate moves upward. This configuration can restrain the first end plate from moving upward and further coming off the case member. In other words, the battery pack can be provided with the battery stack appropriately restrained against separation from the case member.

Furthermore, the battery pack according to the present disclosure may be configured such that the end plates include a second end plate located adjacent to the end wall part, the end wall part is provided with a second separation-restraining part configured to restrain the second end plate from moving upward and further coming off the case member, and the second end plate is provided with a second hook part that engages the second separation-restraining part when the second end plate moves upward. This configuration can prevent both the first end plate and the second end plate from moving upward and further coming off the case member. In other words, the battery pack can be provided with the battery stack appropriately restrained against separation from the case member.

Furthermore, the battery pack according to the present disclosure may be configured such that the second separation-restraining part is provided at a higher position than the first separation-restraining part, and the first hook part has a longer length in the stacking direction of the battery stack than the second hook part. This configuration can more reliably restrain both the first end plate and the second end plate from moving upward and further coming off the case member.

Furthermore, the battery pack according to the present disclosure may be configured such that the battery stack includes end plates located outside the battery cells arranged at both ends in the stacking direction, the case member includes a plurality of fixed parts arranged in the stacking direction of the battery stack and fixed to external fixing parts, the battery pack has a gravity center that is located eccentrically, relative to a midpoint between two of the plurality of fixed parts, located at both ends in the stacking direction of the battery stack, toward an eccentric-side fixed part that is one of the two fixed parts located at both ends in the stacking direction, one of the end wall part or the end panel, the one being located more distant from the eccentric-side fixed part in the stacking direction of the battery stack, is provided with a separation-restraining part configured to restrain the end plate adjacent to the one of the end wall part or the end panel from moving upward and further coming off the case member, and the end plate adjacent to the one of the end wall part or the end panel is provided with a hook part that engages the separation-restraining part when the end plate moves upward. This configuration can restrain one end plate, which is more susceptible to vibration and likely to move, out of the end plates arranged at both ends in the stacking direction of the battery cells, from coming off the case member. In other words, the battery pack can be provided with the battery stack appropriately restrained against separation from the case member.

Moreover, the production method of the battery pack according to the present disclosure may be configured such that the mounting-shape part of the case member includes a plurality of mounting-shape parts that are located at a plurality of positions on the opposite end of the case member from the end wall part, the pressing of the battery stack against the end wall part is performed by moving forward the battery stack from a side of the mounting-shape part toward the end wall part, the compressing of the battery stack is performed until at least a part of the plurality of mounting-shape parts, which is hidden by the battery stack before the battery stack is compressed, becomes exposed, and the mounting is performed by mounting the end panel in one of the mounting-shape parts, which is exposed when the battery stack is compressed. According to the method configured as above, the position of the end panel can be appropriately adjusted according to the individual differences among the battery stacks in length in the stacking direction. No special components and processes are required to adjust the position of the end panel according to the individual differences among the battery stacks in length in the stacking direction. Therefore, even when the battery stacks have large individual differences in length in the stacking direction, the present method can produce the battery pack including such battery stacks at low costs.

Furthermore, the production method of the battery pack according to the present disclosure may be configured such that the floor part of the case member includes an aligning-shape part configured to align the battery cells of the battery stack in the stacking direction, the battery stack further includes an engagement member for each of the battery cells, the engagement member being configured to engage with the aligning-shape part, and the pressing of the battery stack against the end wall part is performed while bringing the engagement member and the aligning-shape part into engagement with each other. According to the method configured as above, the battery pack with the battery cells aligned in the stacking direction can be produced with an inexpensive cost using the aligning-shape part and the engagement member. No special process is required to align the battery cells in the stacking direction, which can achieve low costs for producing the battery pack.

The battery pack producing method according to the present disclosure may be configured such that the battery stack includes end plates located outside the battery cells arranged at both ends in the stacking direction, the end plates include a first end plate located adjacent to the end panel, the end panel is provided, in a lower part, with a first separation-restraining part configured to restrain the first end plate from moving upward and further coming off the case member, the first end plate is provided with a first hook part that engages the first separation-restraining part when the first end plate moves upward from a state where the battery stack is housed in the case member, and the mounting of the end panel to the mounting-shape part is performed by moving down the end panel with the first separation-restraining part facing down, from above the mounting-shape part. This method can restrain the first end plate from moving upward and further coming off the case member. In other words, this method can produce the battery pack with the battery stack appropriately restrained against separation from the case member.

The battery pack producing method according to the present disclosure may be configured such that the end plates include a second end plate located adjacent to the end wall part, the case member is provided, in the end wall part, with a second separation-restraining part configured to restrain the second end plate from moving upward and further coming off the case member, and the second end plate is provided with a second hook part that engages the second separation-restraining part when the second end plate moves upward from a state where the battery stack is housed in the case member. This method can restrain both the first end plate and the second plate from moving upward and further coming off the case member. In other words, this method can produce the battery pack with the battery stack appropriately restrained against separation from the case member.

The battery pack producing method according to the present disclosure may be configured such that the second separation-restraining part of the case member is provided at a higher position than the first separation-restraining part, and the first hook part of the first end plate has a longer length in the stacking direction of the battery stack than the second hook part of the second end plate. This method can more reliably restrain both the first end plate and the second plate from moving upward and further coming off the case member.

REFERENCE SIGNS LIST 1, 2, 3 Battery pack
10, 11, 12 Battery stack
100 Battery cell
150 Spacer (Engagement member)
155 Aligning protrusion
200, 600, 700 Case member
210, 610 Floor part
220, 620, 720 End wall part
230 Mounting part
231 First mounting-shape part (Mounting-shape part)
232 Second mounting-shape part (Mounting-shape part)
233 Third mounting-shape part (Mounting-shape part)
240 Aligning groove (Aligning-shape part)
250, 650, 655 End panel
560 First end plate
570 Second end plate
561 First hook part
571 Second hook part
621 Second separation-restraining part
651 First separation-restraining part
751, 761 Fixed part
851, 861 Fixing part

What is claimed is:

1. A battery pack comprising:
   a battery stack including a plurality of battery cells stacked one on another;
   a case member in which the battery stack is housed, the case member including:
     a floor part located under the battery stack;
     an end wall part located on one end in a stacking direction of the battery cells, the end wall part being continuously integrated with the floor part; and
     a mounting-shape part located on an end opposite from the end wall part, the mounting-shape part being configured to mount a panel-shaped member; and
   an end panel, which is the panel-shaped member, mounted in the mounting-shape part,
   wherein the battery stack is retained in the case member while being held by compression between the end wall part and the end panel,
   wherein the end panel is pressed against the mounting-shape part in a direction away from the end wall part by compression reaction force of the battery stack, so that the end panel is fixed in the mounting-shape part,
   wherein the battery stack includes end plates located outside the battery cells arranged at both ends in the stacking direction,
   the end plates include a first end plate located adjacent to the end panel,
   the end panel is provided, in a lower part, with a first separation-restraining part configured to restrain the first end plate from moving upward and further coming off the case member, and
   the first end plate is provided with a first hook part that engages the first separation-restraining part when the first end plate moves upward.

2. The battery pack according to claim 1, wherein
   the end plates include a second end plate located adjacent to the end wall part,
   the end wall part is provided with a second separation-restraining part configured to restrain the second end plate from moving upward and further coming off the case member, and
   the second end plate is provided with a second hook part that engages the second separation-restraining part when the second end plate moves upward.

3. The battery pack according to claim 2, wherein
   the second separation-restraining part is provided at a higher position than the first separation-restraining part, and
   the first hook part has a longer length in the stacking direction of the battery stack than the second hook part.

4. A battery pack comprising:
   a battery stack including a plurality of battery cells stacked one on another;
   a case member in which the battery stack is housed, the case member including:
     a floor part located under the battery stack;
     an end wall part located on one end in a stacking direction of the battery cells, the end wall part being continuously integrated with the floor part; and
     a mounting-shape part located on an end opposite from the end wall part, the mounting-shape part being configured to mount a panel-shaped member; and
   an end panel, which is the panel-shaped member, mounted in the mounting-shape part,
   wherein the battery stack is retained in the case member while being held by compression between the end wall part and the end panel,
   wherein the end panel is pressed against the mounting-shape part in a direction away from the end wall part by compression reaction force of the battery stack, so that the end panel is fixed in the mounting-shape part,
   wherein the battery stack includes end plates located outside the battery cells arranged at both ends in the stacking direction, the case member includes a plurality of fixed parts arranged in the stacking direction of the battery stack and fixed to external fixing parts, the battery pack has a gravity center that is located eccentrically, relative to a midpoint between two of the plurality of fixed parts, located at both ends in the stacking direction of the battery stack, toward an eccentric-side fixed part that is one of the two fixed parts located at both ends in the stacking direction, one of the end wall part or the end panel, the one being located more distant from the eccentric-side fixed part in the stacking direction of the battery stack, is provided with a separation-restraining part configured to restrain the end plate adjacent to the one of the end wall part or the end panel from moving upward and further coming off the case member, and the end plate adjacent to the one of the end wall part or the end panel is provided with a hook part that engages the separation-restraining part when the end plate moves upward.

5. A method for producing a battery pack, the battery pack comprising a battery stack including a plurality of battery cells and a case member in which the battery stack is housed, the case member including:

a floor part located under the battery stack;

an end wall part located on one end in a stacking direction of the battery cells, the end wall part being continuously integrated with the floor part; and a mounting-shape part located on an end opposite from the end wall part, the mounting-shape part being configured to mount a panel-shaped member, wherein the method comprises:

inserting the battery stack into the case member while compressing the battery stack in the stacking direction, and pressing one end of the battery stack in the stacking direction against the end wall part;

mounting an end panel, which is the panel-shaped member, in the mounting-shape part; and releasing the battery stack from the compressing to allow an opposite end of the battery stack in the stacking direction to press against the end panel so that:

the battery stack is housed in the case member while being held by compression between the end wall part and the end panel, and the end panel is pressed against the mounting-shape part in a direction away from the end wall part by compression reaction force of the battery stack, so that the end panel is fixed in the mounting-shape part, wherein the battery stack includes end plates located outside the battery cells arranged at both ends in the stacking direction, the end plates include a first end plate located adjacent to the end panel, the end panel is provided, in a lower part, with a first separation-restraining part configured to restrain the first end plate from moving upward and further coming off the case member, the first end plate is provided with a first hook part that engages the first separation-restraining part when the first end plate moves upward from a state where the battery stack is housed in the case member, and the mounting of the end panel to the mounting-shape part is performed by moving down the end panel with the first separation-restraining part facing down, from above the mounting-shape part.

6. The method for producing a battery pack according to claim 5, wherein the end plates include a second end plate located adjacent to the end wall part, the case member is provided, in the end wall part, with a second separation-restraining part configured to restrain the second end plate from moving upward and further coming off the case member, and the second end plate is provided with a second hook part that engages the second separation-restraining part when the second end plate moves upward from a state where the battery stack is housed in the case member.

7. The method for producing a battery pack according to claim 6, wherein the second separation-restraining part of the case member is provided at a higher position than the first separation-restraining part, and the first hook part of the first end plate has a longer length in the stacking direction of the battery stack than the second hook part of the second end plate.

* * * * *